US009198219B2

(12) United States Patent
Huang et al.

(10) Patent No.: US 9,198,219 B2
(45) Date of Patent: Nov. 24, 2015

(54) ADAPTIVE FAST DORMANCY CONTROLLER

(75) Inventors: Yuheng Huang, San Diego, CA (US); Bongyong Song, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 13/605,156

(22) Filed: Sep. 6, 2012

(65) Prior Publication Data

US 2014/0064134 A1 Mar. 6, 2014

(51) Int. Cl.
*H04L 1/00* (2006.01)
*H04W 76/06* (2009.01)

(52) U.S. Cl.
CPC .................................. *H04W 76/068* (2013.01)

(58) Field of Classification Search
None
See application file for complete search history.

(56) References Cited

U.S. PATENT DOCUMENTS

| 8,654,691 | B2 * | 2/2014 | Anderson et al. ............. 370/310 |
|---|---|---|---|
| 2003/0100310 | A1 | 5/2003 | Lindner et al. |
| 2008/0127257 | A1 | 5/2008 | Kvache |
| 2008/0198871 | A1 | 8/2008 | Shahidi et al. |
| 2009/0042560 | A1 | 2/2009 | Islam et al. |
| 2010/0144363 | A1 | 6/2010 | De Rosa et al. |
| 2011/0319064 | A1 | 12/2011 | Lenart et al. |
| 2012/0020393 | A1 | 1/2012 | Patil et al. |
| 2012/0051288 | A1 | 3/2012 | Dwyer et al. |
| 2012/0052814 | A1 | 3/2012 | Gerber et al. |
| 2014/0256265 | A1 | 9/2014 | Song et al. |

FOREIGN PATENT DOCUMENTS

EP 1202495 A2 5/2002

OTHER PUBLICATIONS

Desousa M., et al., "Mapping synchronisation protocols onto RT CORBA", Distributed Objects and Applications, 2000. Proceedings. DOA '00. International Symposium on Sep. 21-23, 2000, Piscataway, NJ, USA, IEEE, Sep. 21, 2000, pp. 89-96, XP010514362, ISBN: 978-0-7695-0819-1.
International Search Report and Written Opinion—PCT/US2013/058554—ISA/EPO—Jan. 2, 2014.
Research in Motion Limited: "Fast Dormancy: A way forward", 3GPP Draft; R2-084647, 3rd Generation Partnership Project (3GPP), Mobile Competence Centre ; 650, Route Des Lucioles ; F-06921 Sophia-Antipolis Cedex ; France, no. Jeju; Aug. 20, 2008, XP050319640, [retrieved on Aug. 20, 2008].
Qian et al., "TOP: Tail Optimization Protocol for Cellular Radio Resource Allocation," 18th IEEE International Conference on Network Protocols (ICNP), 2010, pp. 285-294, Doi: 10.1109/ICNP. 2010.5762777.

* cited by examiner

*Primary Examiner* — Willie J Daniel, Jr.
(74) *Attorney, Agent, or Firm* — Jeffrey D. Jacobs

(57) ABSTRACT

Methods, devices, and instructions stored in non-transitory computer-readable medium are provided for adaptively adjusting when a mobile device requests fast dormancy (FD) by determining when applications executing on the mobile device stop using a connection to a cellular telecommunications network. An adaptive fast dormancy controller function executing on a processor of the mobile device monitors network traffic activity by the applications. The adaptive fast dormancy controller function may determine that an open network connection should be released using a device traffic inactivity timer that times durations of network inactivity by applications. The duration of the device traffic inactivity timer may be adjusted based upon observed application and/or network conditions. Multiple device traffic inactivity timers may be used to enable timing traffic inactivity of each application or groups of applications executing on the mobile device.

88 Claims, 14 Drawing Sheets

ADAPTIVE FAST DORMANCY CONTROLLER

BACKGROUND

Wireless communication networks are widely deployed to provide various communication services such as telephony, video, data, messaging, broadcasts, and so on. Such networks, which are usually multiple access networks, support communications for multiple users by sharing the available network resources. In order to ensure network resources are available to more users, networks may terminate high-speed connections to mobile devices upon expiry of networks-defined and maintained inactivity timers. Since maintaining high-speed network connections consumes battery power, the mobile device may also utilize available network commands to immediately release network connections when all the applications running on the device no longer require an open connection to the network. However, such feature is not efficiently executed because application developers do not always include such commands in programs; and even if every application developer utilized such network commands, a central controller would still be needed to coordinate among multiple running applications and decide when to release the connection. As a result, high-speed network connections may remain open longer than necessary, needlessly draining mobile device batteries and occupying network bandwidth.

SUMMARY

Methods, devices, and instructions stored in non-transitory computer-readable medium are provided for selectively sending a connection release message to a wireless telecommunications network on behalf of an application executed on the mobile device. An adaptive fast dormancy control module implemented on a mobile device as part of an operating system or background process monitors network socket calls made by the application executing on the mobile device. The fast dormancy control module may determine when the mobile device operations indicate user inactivity and when an application no longer requires a network connection based upon detected network socket calls. When such an application or user inactivity condition is detected the adaptive fast dormancy control module may cause the mobile device to send a connection release message to the telecommunications network to request release of a connection on behalf of the application.

BRIEF DESCRIPTION OF DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
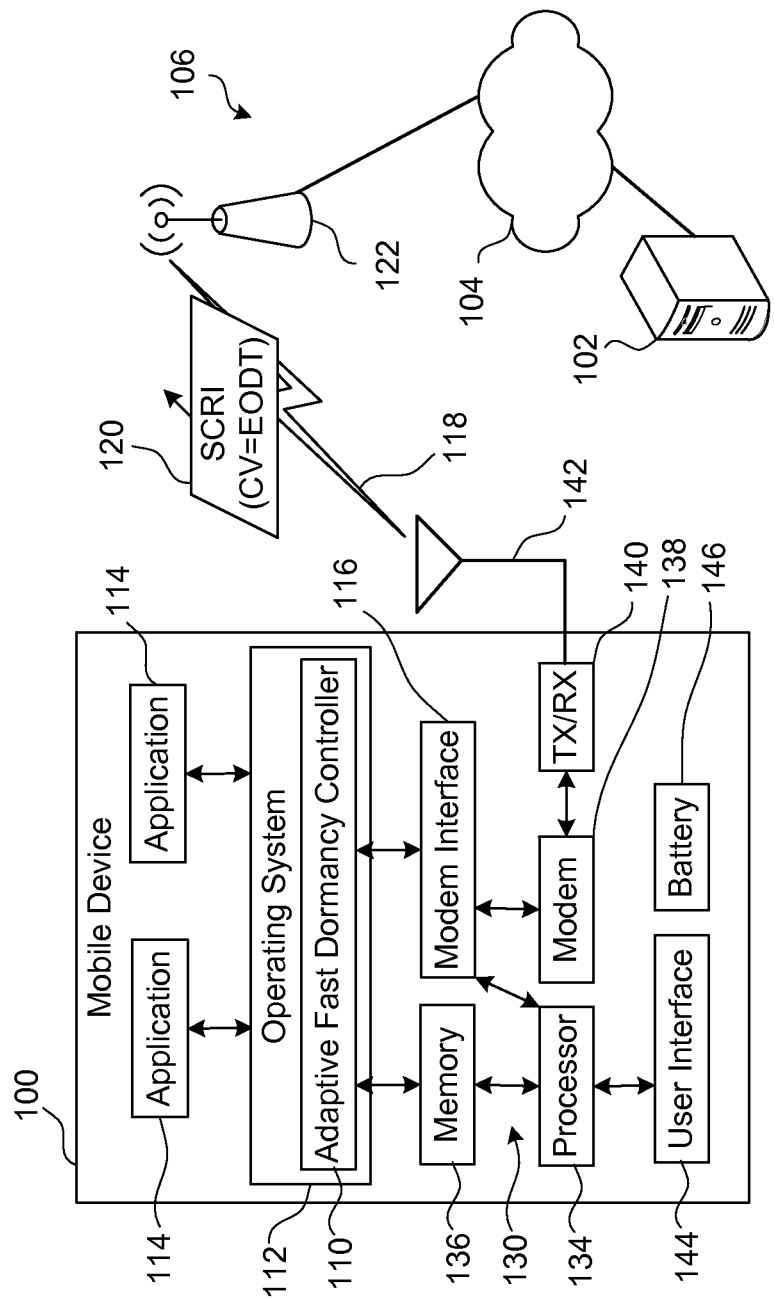
FIG. 1 is a block diagram of a communication system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," and "mobile communication device" are used interchangeably herein to refer to any one or all of cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals via an open connection to a wireless network. While the various embodiments are particularly useful in mobile devices, such as cellular telephones, which have limited battery life, the embodiments are generally useful in any computing device that establishes communication sessions with a wireless telecommunication network.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). It should be understood that any references to terminology and/or technical details related to an individual telecommunication standard or technology are for illustrative purposes only, and are not intended to limit the scope of the claims to a particular communication system or technology unless specifically recited in the claim language.

Telecommunications networks, such as 3G, 4G, LTE and UMTS networks, typically have several activity states including states known as Cell-DCH, Cell-FACH, and Idle. When transferring data to and from a telecommunication network, a mobile device is placed in the Cell-DCH state, which uses high-speed channels to transmit and receive data. There are only fixed number of mobiles devices that can be assigned a high speed channel at any given time, and the occupation of these channels is maintained even when no data is being sent or received to or from the mobile devices (e.g. while the user reads a web page, or while the phone is inactive). Thus, it is a waste of network resources to leave a mobile device in the Cell-DCH state when the connections are inactive. Also, maintaining high-speed connections to telecommunications networks consumes a significant amount of energy in the mobile device that may quickly deplete the mobile device's battery.

To conserve energy and network resources, telecommunication networks may move inactive connections to the Cell-FACH state, which has a slower data rate but supports more users. Subsequently, telecommunication networks may move inactive connections to the idle state, which tears down the connection between the network and the mobile device. Telecommunication networks decide when to make such changes in the connection states by using a network-based inactivity timer that begins counting down when a network interactivity ends with a mobile device and that is reset whenever network activity is resumed. If the network-based inactivity timer counts down to zero, the network may instruct the mobile device to change to the Cell-FACH state after a first period of inactivity (e.g., after 2 seconds), or to change to the Idle state after a second period of inactivity (e.g., after 15 seconds of inactivity). When the network directs the mobile device to enter the idle state, the network may also tear down the established connection to the mobile device, thereby freeing up network resources for use by other mobile devices.

Changing states based on the network's inactivity timer is inefficient since the entire duration must pass before the state is changed. Modern mobile devices may have applications (e.g., e-mail clients, instant messengers) that periodically contact a server and/or otherwise reset the network's inactivity timer. The network's inactivity timer is not informed of such applications, and cannot predict when such applications are going to send or request information.

Existing solutions address these limitations by implementing a fast dormancy scheme, in which the mobile device applications cause a Signaling Connection Release Indication (SCRI) message to be sent to the telecommunications network to request the release of the connection when the application determines that the connection is no longer necessary. That is, instead of waiting for the connection to be put into the Cell-FACH state and then the Idle state by the network based on the network's inactivity timer, a mobile device application may proactively request a transition to the Idle state when the application determines that the connection is not going to be used for an extended period of time. Such application-initiated SCRI messages may be initiated by the application developer including a standard API in the application code.

However, since application developers may be more concerned with the application's functionality than the mobile device's battery consumption characteristics (or the network's resource availability), they may not implement the fast dormancy scheme within application code in the most efficient manner. Even if every application utilized the fast dormancy scheme, a central controller would still be necessary to coordinate among multiple running applications to decide when the mobile device should send the SCRI message to request a state transition. Also, network traffic patterns of applications running on the mobile device can change over time due to various factors, e.g., changes in the radio link quality, response latency of the server, the functionality of particular applications, and the interplay that can result among different combinations of applications running simultaneously on the mobile device.

To resolve these limitations in current network systems and with developer-implemented SCRI messages, the various embodiments provide an adaptive fast dormancy controller for implementation on mobile devices that can determine when an SCRI message should be sent by a mobile device based upon observations of application network interactivity. In the various embodiments the fast dormancy controller may monitor applications executing on the mobile device, determine when a network connection is inactive, and automatically send an SCRI message to the telecommunications network to request a release of the connection when it is determined that a particular connection is inactive. The adaptive fast dormancy controller may intelligently decide when a connection should be closed using the information available to the processor (e.g., power state of the operating system, type of the application or service, patterns in the network interactivity of the currently executing applications, socket calls, etc.). Implementing the adaptive fast dormancy controller as part of the mobile device (e.g., as part of a run time environment, operating system, or other background process) can more rapidly release connections than may be possible depending solely on the network's inactivity timers, and relieves application developers of the need to decide when an SCRI message should be sent.

The adaptive fast dormancy controller may include one or more device traffic inactivity timers that count down a predetermined amount of time (or count up for a pre-determined duration) beginning when network traffic is not observed. In other words, a device traffic inactivity timer may be started after a network communication (i.e., traffic activity) ends, and reset each time network traffic is observed by the mobile device. If the device traffic inactivity timer reaches zero (or counts up to the predetermined duration), the adaptive fast dormancy controller may send an SCRI (or similar) message to the telecommunications network requesting termination of the connection or otherwise indicating that the mobile device is no longer using a connection. In an embodiment, the adaptive fast dormancy controller may pause or delay the transmission of an SCRI message by an amount of time, which may be determined by a second short-duration delay timer, in order to provide time for messages transiting through the device or network layers to be delivered, accommodate network variability, and reduce the potential for "thrashing" network connections by tearing them down too quickly.

In the various embodiments, the fast dormancy controller is made adaptive by adjusting the duration of the device traffic inactivity timer based upon observed application or network characteristics or events. By adaptively shortening the device traffic inactivity timer, the adaptive fast dormancy controller can adjust to application and/or network conditions that are conducive to more rapidly tearing down idle connections, thereby saving more battery power and conserving network resources. By adaptively lengthening the device traffic inactivity timer in response to application and/or network conditions that exhibit greater variability in time intervals between interactivity events, the adaptive fast dormancy controller can accommodate such conditions while they exist in order to maintain reliable network connections and avoid thrashing. Such changes in the device traffic inactivity timer value may be accomplished based upon observed statistical profiles of the interactivity time intervals, and/or whether inactivity determinations were accurate.

In an embodiment, the adaptive fast dormancy controller may include a single device traffic inactivity timer that times inactivity of all applications and communications on the mobile device. In another embodiment, there may be multiple device traffic inactivity timers to accommodate differences in network access patterns or network access requirements of various applications and functions executing on the mobile device. In an embodiment, one device traffic inactivity timer may be associated with each application running on the mobile device, enabling the inactivity timer duration to be matched to network usage and access requirements of each application. In another embodiment, there may be multiple device traffic inactivity timers set for different predetermined amounts of time, and traffic activity of groups of applications may be monitored by different or by an application running on the mobile device In these embodiments, the SCRI message may not be transmitted by the mobile device until all of the active device traffic inactivity timers have reached zero (or counted up to their respective predetermined amounts of time).

In various embodiments the adaptive fast dormancy controller may be implemented as a software module or a module within an operating system or run time environment executing on the mobile device processor. Alternatively, the adaptive fast dormancy controller may be implemented as a process within another software module, or within the operating system or run time environment. Further, the adaptive fast dormancy controller may be implemented as an application configured to run in the background. In a further embodiment, the adaptive fast dormancy controller may be implemented partially or entirely in firmware. When implemented in software or as a process the adaptive fast dormancy controller functionality will be accomplished by a processor of the mobile device executing the software instructions or process steps. To encompass all of the various implementations contemplated in the embodiments, the functionality of the embodiments is referred to herein generally as an adaptive fast dormancy controller, but such terminology is not intended to require any particular type of hardware and/or software implementation. References to the adaptive fast dormancy controller also encompass the processor executing the associated software instructions or process steps.

FIG. 1 illustrates logical components and functional modules of a user equipment (UE) or mobile device 100 that receives services 102 on a packet data network 104 via a wireless telecommunications network 106. In the embodiment illustrated in FIG. 1, an adaptive fast dormancy controller 110 is logically positioned as part of an operating system 112 between an application layer, depicted as applications 114, and a modem interface 116 on the mobile device 100. In other embodiments, the adaptive fast dormancy controller 110 may be incorporated within the modem 138 or as an application 114 which monitors traffic activities of a mobile device 100. As described in more detail below, the adaptive fast dormancy controller 110 may monitor the network interactivity events of the applications 114 executing on the mobile device 100 to determine when a connection 118 should be released based on expiration of one or more device traffic inactivity timers. When the adaptive fast dormancy controller 110 determines that the connection 118 may be released, it may send a connection release message 120 to a base node 122 of a radio access network (RAN) to close the connection 118. The connection release message 120 may include a code, referred to as the "cause value" indicating the reason the connection is being released. For example, FIG. 1 illustrates an SCRI message having a cause value of end of data transfer (EODT) meaning that the data transfer session has ended. The adaptive fast dormancy controller 110 may initiate transmission of an SCRI message based upon observed network interactivity on behalf of applications 114 to exercise fast dormancy. In this manner, the adaptive fast dormancy controller 110 can request release of a connection before a network inactivity timer initiates and without the need for any application fast dormancy requests.

A mobile device 100 may include a processing system 130, including one or more processors, represented generally by the processor 134, and computer-readable media, represented generally by the computer-readable medium 136. The processing system 130 may access a number of circuits of the mobile device 100, such as timing sources, peripherals, voltage regulators, and power management circuits. A modem interface 116 may provide an interface between an operating system 112 and a modem 138, which includes a transceiver (transmitter/receiver (TX/RX)) 140 that use one or more antennas 142. The transceiver 140 enables wireless communication with the wireless telecommunication network 106. A user interface 144 (e.g., keypad, display, speaker, microphone, joystick) may also be provided. The mobile device 100 may include a portable source of power, such as a battery 146.

The adaptive fast dormancy controller 110 may monitor network connection activities of applications 114 running on the mobile device 100 while connected to a cellular telecommunications network 106, and transmit a connection termination request when the mobile device determines that the applications are not presently utilizing an open connection. By requesting termination of a connection to the telecommunications network when the mobile device detects a period of inactivity, the mobile device can reduce its power consumption, and thereby increase the time that the mobile device can operate on battery power. The adaptive fast dormancy controller 110 functionality may detect network connection inactivity by monitoring network socket calls made by one or more applications executing on the mobile device, and determining when the duration since a last network interactivity exceeds the threshold value. This determination may be made by restarting a device traffic inactivity timer after each network interactivity event (i.e., either the sending of a message or the receipt of a message). As described in more detail below, if the device traffic inactivity timer counts down from the threshold value to zero (or counts up to the threshold value), adaptive fast dormancy controller 110 may send a connection release message (e.g., an SCRI message) to the wireless telecommunications network 106 to request release of a connection on behalf of the application 114. In various embodiments, the fast dormancy controller may be made adaptive by adjusting the threshold value of the device traffic inactivity timer based upon current conditions and/or the applications currently running on the mobile device.

The various embodiments presented throughout this disclosure may be implemented across a broad variety of telecommunication systems, network architectures, and communication standards. Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Figure 2:
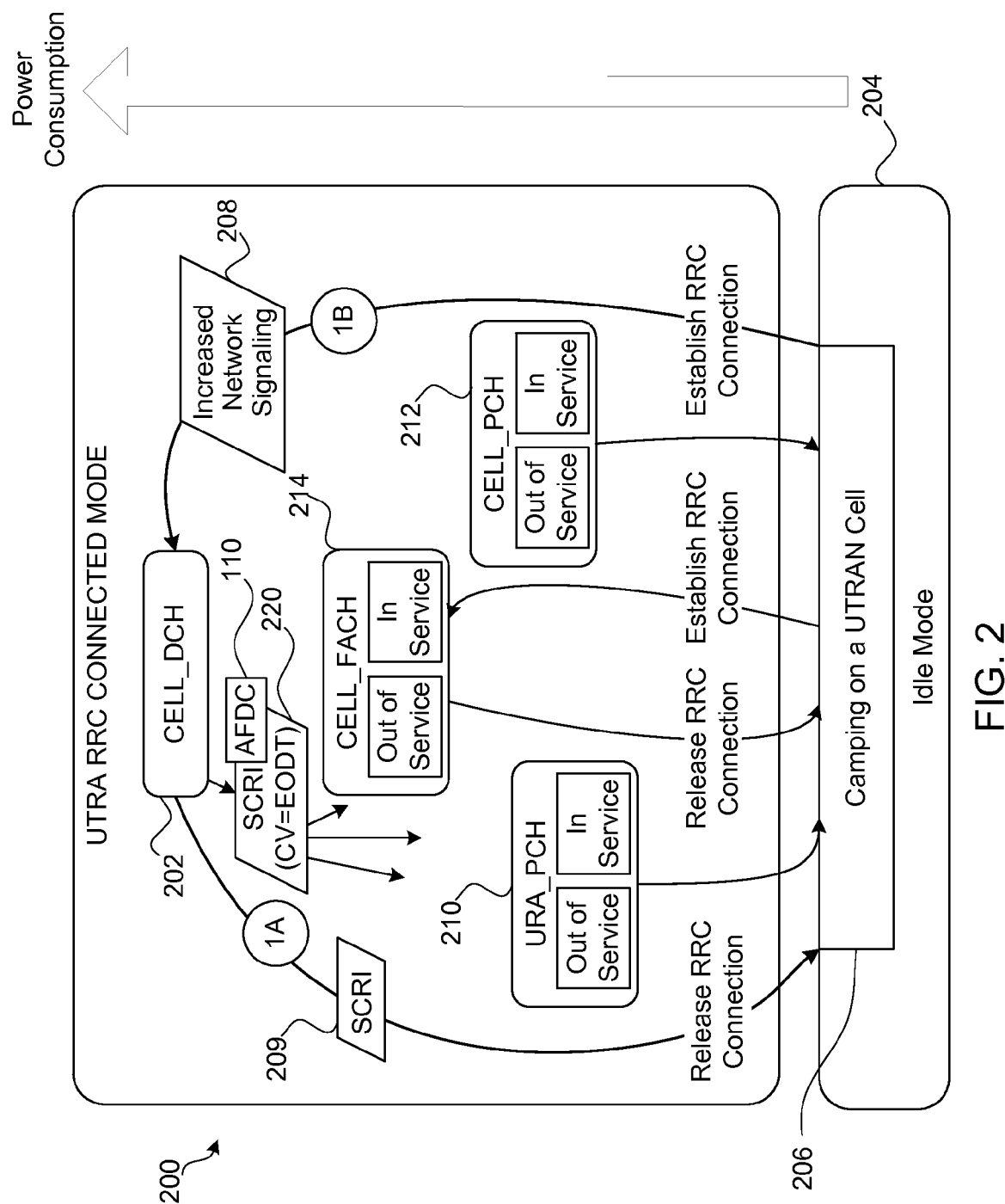
FIG. 2 is a state diagram for a UMTS Terrestrial Radio Access (UTRA) RRC Radio Resource Control (RRC) connected mode illustrating various states of a mobile device.

FIG. 2 is a state diagram 200 illustrating a selected set of Radio Resource Control (RRC) state transitions from device highest power consumption (Cell_DCH state 202) to lowest power consumption (Idle mode 204). In the Idle mode 204, a high data rate connection to the telecommunications network is not open so the mobile device does not transmit, or transmits only rarely location area updates and routing area updates, with the radio inactive most of the time, "waking up" every idle Discontinuous Reception (DRX) cycle. Therefore, in the Idle mode 204 the mobile device is in a low power consumption state. In this state the mobile device monitors the radio environment, listening to the Common Pilot Channel (CPICH) of the cell tower on which it is camped as depicted at 206 and the neighboring cell towers, and also the Paging Indicators Channel (PICH) looking only at its Paging Indicator Boolean flag that indicates whether the mobile device should read the Paging Channel. In this state the mobile device has lost its RRC connection with the network so any new data transmission will require re-establishing the control connection first. The mobile device may send an SCRI message 209 to enter into the Idle mode 204.

In the URA_PCH and Cell_PCH states 210, 212, the mobile device connected to the network, but no user data is sent, so the mobile device may operate with low power consumption determined by the DRX cycles of the PCH states.

In the Cell Paging Channel (Cell_PCH) state 212, the control connection has not been lost; the mobile device still has a RRC connection but seldom uses it. The mobile device listens to the same channels as in Idle. The mobile device informs the network whenever it camps in a new cell. To send this cell update, the mobile device needs to switch to Cell Forward Access Channel (Cell_FACH) temporarily. The radio is inactive most of the time, "waking up" every Cell_PCH DRX cycle.

The UTRAN Registration Area Paging Channel (URA_PCH) state 210 is identical to Cell_PCH, except that in URA_PCH, the updates are only sent when there is a change in the UTRAN Registration Area (URA), typically a larger number of cells, instead of when there is a change in the cell.

In the Cell_FACH state 214, the mobile device is in connected mode, but using common or shared channels. This state is useful for transmission and reception of short data packets. For the Uplink the Random Access Channel (RACH) is used and for the Downlink the FACH is used. In this state, the mobile device may send data on the RACH messages and may receive data on the FACH.

In Cell Dedicated Channel (Cell_DCH) state 202, the mobile device is connected to the network but using a dedicated channel or a share of the High Speed Downlink Shared Channel (HS-DSCH) and/or an Enhanced Dedicated Channel (E-DCH). This state is useful for transmission and reception of large data. Remaining in the Cell_DCH state enables immediate connection and higher throughput than possible staying in the Cell_FACH state. On the other hand, the battery lifetime is longer and the load on the network is minimized when the mobile device is in the Idle mode. Therefore, the network will move the mobile device to a higher energy states when it is needed to transmit or receive and then direct it back to the Idle mode when no further transmission is expected. In most cases, the mobile device is directed by the network from one state to another, although there are cases in which the mobile device may autonomously move from one state to another, such as a transition from a PCH state to CELL_FACH to send CELL_UPDATE messages, and a radio link failure. For example, after some time of inactivity, the network usually decides to place the mobile device in Cell_FACH state, and then after a further duration of inactivity network will place the mobile device in Idle mode 204 and tear down the connection.

The adaptive fast dormancy controller 110 may determine when to transmit a connection release SCRI request message, and thus inform the network of when the network connection should be torn down and the device transitioned to the Idle mode. As an alternative to transmitting an SCRI message 209, the adaptive fast dormancy controller 110 may allow the network to use URA_PCH and Cell_PCH states 210, 212 rather than asking the network to drop the connection with the mobile device to Idle mode 204. In an exemplary embodiment, the connection release message may be an SCRI message with an "end of data transfer" cause value 220.

Figure 3:
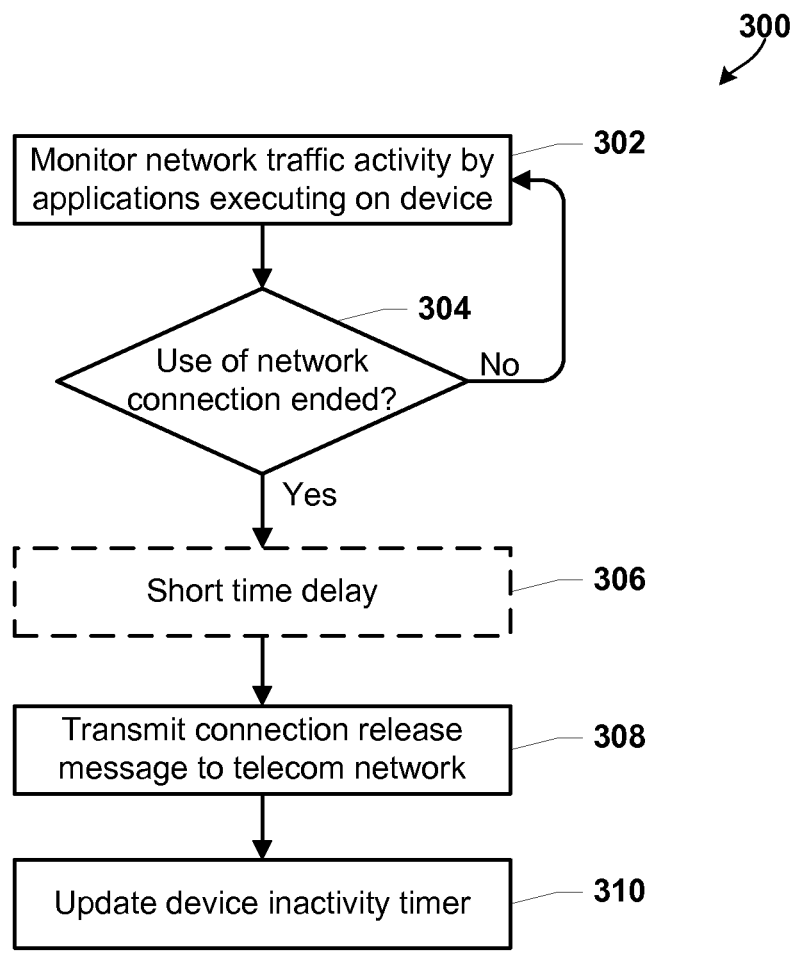
FIG. 3 is a process flow diagram of an overview of the various embodiment methods.

FIG. 3 illustrates an overview embodiment method 300 that may be implemented in an adaptive fast dormancy controller. Generally, a mobile device processor implementing the adaptive fast dormancy controller will monitor network traffic activity by applications executing on the mobile device in block 302. More details regarding such monitoring are provided below with reference to FIGS. 4 through 12B. Based upon the monitored network traffic activity, the processor determines whether use of a network connection has ended in determination block 304. So long as the processor determines that the network connection remains in use (i.e., determination block 304="No"), the processor may continue to monitor network traffic activity by applications in block 302.

When the processor determines that applications executing on the mobile device have ended their use of the network connection (i.e., determination block 304="Yes"), the processor executing the adaptive fast dormancy controller may transmit a connection release message to the telecommunications network in block 308, with the transmission of that message optionally delay by a short amount of time in optional block 306. The purpose for having a short time delay in block 306 before transmitting the connection release message in block 308 is to permit any data in communication to complete transmission before the communication link is torn down.

In block 310, the processor may update the device traffic inactivity timer based upon information gathered by execution of method 300, such as the time interval between network activity or whether the determination to transmit the connection release message made in determination block 304 was correct or incorrect (e.g., the connection was required for message traffic very soon after the connection release message was transmitted). Updating the device traffic inactivity timer duration in this manner enables the fast dormancy controller to adapt to network and application conditions so as to provide better responsiveness for applications while conserving battery power and network resources.

Figure 4:
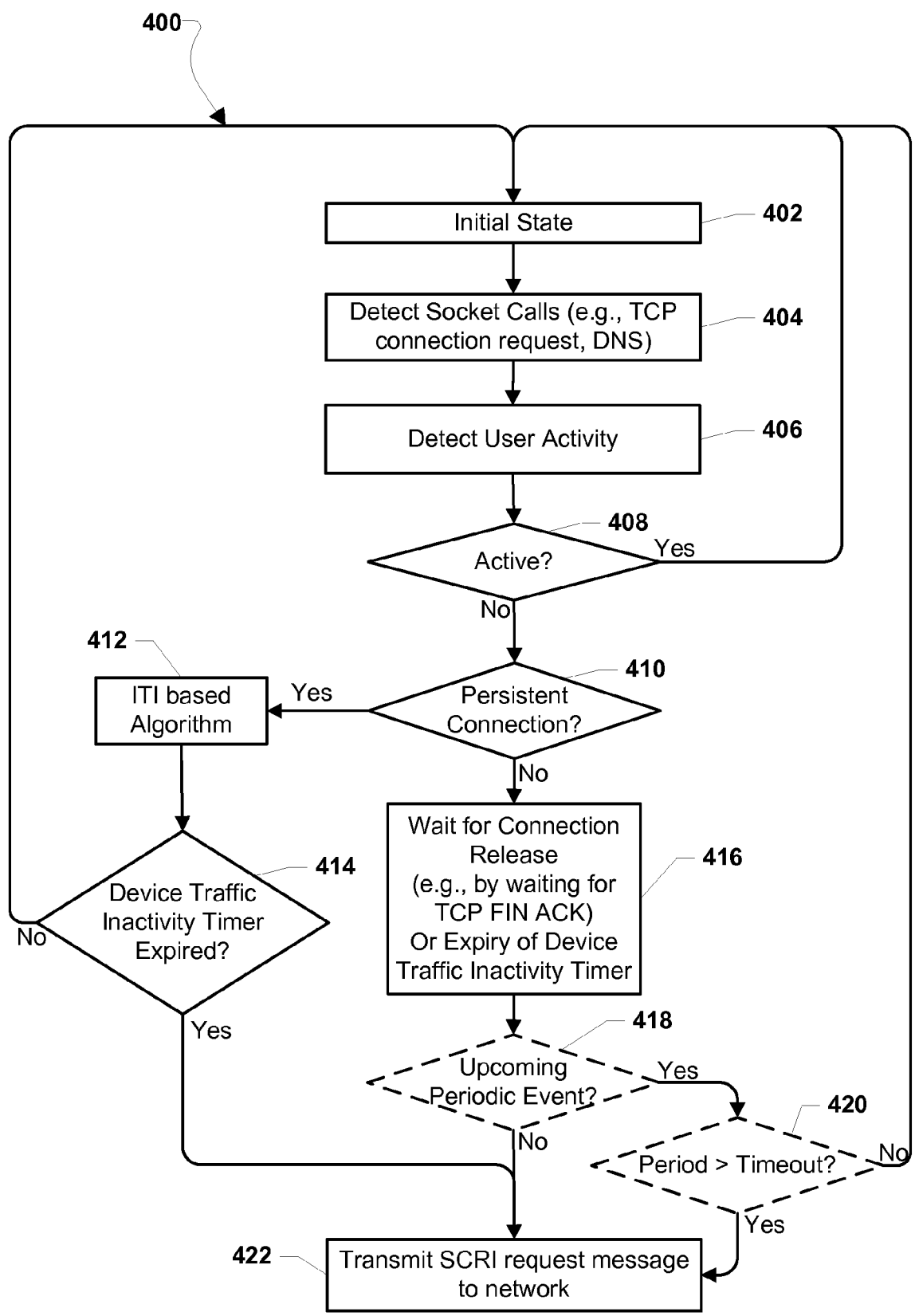
FIG. 4 is a process flow diagram of an embodiment method of an adaptive fast dormancy controller.

FIG. 4 illustrates an embodiment method 400 for monitoring network connection activities of applications executing on the mobile device and automatically sending SCRI messages to release inactive connections. In block 402, the adaptive fast dormancy controller executing on a processor of the mobile device may be in an initial state. In block 404, the adaptive fast dormancy controller may detect socket calls. For example, the adaptive fast dormancy controller may monitor transmission control protocol (TCP) connection requests and domain name system (DNS) requests passing through a socket connected to the wireless telecommunication network. In block 406, the adaptive fast dormancy controller may detect user activity. This may be accomplished, for example, by determining whether the mobile device is being moved, whether the display is on, whether the microphone is on, whether the Bluetooth connection is on, and/or by using other similar information collected from mobile device states.

In determination block 408, the adaptive fast dormancy controller may determine whether the user is actively engaged with the mobile device (e.g., the user is reading something displayed on the screen). If it is determined that the user is active (i.e., determination block 408="Yes"), the adaptive fast dormancy controller may return to the initial state in block 402 without modifying the connections, thus the mobile device may remain in the Cell-DCH state. If it is determined that the user is not currently active (i.e., determination block 408="No"), in determination block 410, the adaptive fast dormancy controller may determine whether any application has established a persistent connection with the telecommunications network. As discussed above, a persistent connection may be a connection to a network that is maintained "open" for an extended period of time even when data is not being transmitted.

If the adaptive fast dormancy controller determines that an application has not established a persistent connection (i.e., determination block 410="No"), in blocks 416, 118, and 422, the adaptive fast dormancy controller may perform "direct fast dormancy" operations. For example, in block 416, the adaptive fast dormancy controller may wait until the connection is released (e.g., wait for a TCP FIN ACK signal) or the device traffic inactivity timer expires. After the connection is released (e.g., after a TCP finish acknowledgement (FIN ACK) signal is received) or the device traffic inactivity timer expires, in optional determination block 418, the adaptive fast dormancy controller may determine whether there are any upcoming periodic communication events (e.g., an email client scheduled to check for mail in 20 seconds, etc.). If the adaptive fast dormancy controller determines that there are no upcoming periodic events (i.e., determination block 418="No"), in block 422, the adaptive fast dormancy controller may transmit an SCRI message requesting termination of the open connection. If the adaptive fast dormancy controller determines that there are upcoming periodic communication events (i.e., determination block 418="Yes"), in optional determination block 420, the adaptive fast dormancy controller may determine whether the upcoming periodic communication event is going to occur after the next network timeout, such as the time before the next event will exceed the network's inactivity timer. If the adaptive fast dormancy controller determines that the periodic event time is less than or equal to the next network timeout time (i.e., determination block 420="No"), the adaptive fast dormancy controller may return to the initial state in block 402 without modifying the connections. If the adaptive fast dormancy controller determines that the periodic event time is greater than the next network timeout time, in other words the next periodic event will occur after the network's inactivity timer expires (i.e., determination block 420="Yes"), in block 422, the adaptive fast dormancy controller may transmit an SCRI message to the network.

As part of transmitting an SCRI request message to the network in block 422, a small delay (e.g., ranging from a few hundreds of milliseconds to a few seconds) may be introduced before starting the SCRI transmission. This delay enables the device to accommodate situations in which the socket is closed but there is activity from the network or residue data in the lower layers of the mobile device to be sent. In such situations, the delay enables any data in the transmission layers or otherwise in the process of transmission to be sent before the connection is torn down. At the end of this short delay the adaptive fast dormancy controller (or another element of the operating system) may check whether any socket has been opened or reopened, or whether there is any other indication of network traffic or impending network traffic by an application. If no socket has been opened and there is no indication that network traffic is about to be sent or received, the SCRI request message may be transmitted. If a socket has been opened or reopened, the SCRI transmission may be cancelled and the adaptive fast dormancy controller may return to the initial state in block 402. In this manner the mobile device can promptly request release of a connection that will be terminated anyway because the next communication will occur after the network inactivity timer will expire.

Returning to determination block 410, if the adaptive fast dormancy controller determines that an application has established a persistent connection (i.e., determination block 410="Yes"), in blocks 412 and 414, the adaptive fast dormancy controller may perform "inter-traffic interval (ITI) based fast dormancy" operations. In these operations, the decision of whether to transmit and SCRI request message may be based upon the inter-traffic interval, which is also referred to herein as the $T_{ITI}$, which is defined as the time interval between two sequential packet transactions (i.e., sending or receiving a packet). The inter-traffic interval $T_{ITI}$ is described below in more details with reference to FIG. 9.

In block 412, the adaptive fast dormancy controller may evaluate current network traffic conditions, executing applications and other factors to determine whether a device traffic inactivity timer value should be adjusted. Example methods that may be implemented as part of block 412 for adjusting device traffic inactivity timer values are described below with reference to FIG. 10-12B. In determination block 414, one or more device traffic inactivity timers may be started when a network traffic event ends to count down (or up) to the timer value that may be set in block 412. If the device traffic inactivity timer expires before the next packet transaction (i.e., determination block 414="Yes"), the adaptive fast dormancy controller may transmit an SCRI request message to the network in block 422 as described above. If, on the other hand, a traffic activity event (e.g., a packet transaction) occurs before the device traffic inactivity timer expires (i.e., determination block 414="No"), the adaptive fast dormancy controller may reset the device traffic inactivity timer and return to its initial state in block 402. The time between when the last network activity event ended and the traffic event causing reset of the device traffic inactivity timer provides an inter-traffic interval sample that may be used to update the inter-traffic interval statistics as part of block 412.

As mentioned above, an advantage of the adaptive fast dormancy controller embodiments is their ability to adapt to current applications and network conditions, such as by adjusting one or more device traffic inactivity timer values used to predict when applications have stopped using an open network connection. Such adjustments may be based upon heuristic rules (e.g., particular durations for particular applications executing on the mobile device), observed results of previous determinations (e.g., whether a previous fast dormancy decision was correct), and/or observed network activity (e.g., trends or statistical profiles of the inter-traffic interval).

Figure 5:
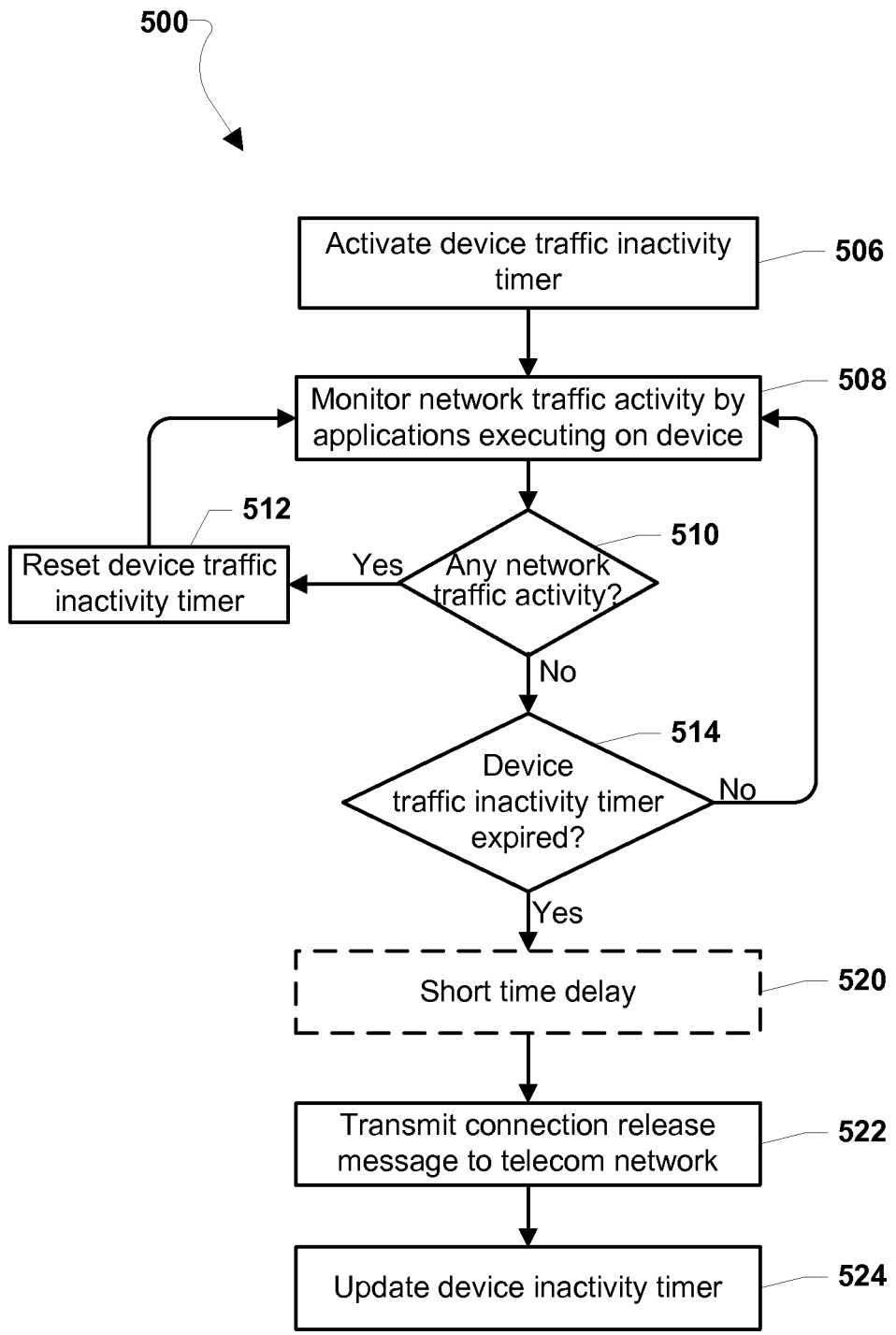
FIGS. 5 and 6 are process flow diagrams of alternative embodiment methods for determining when to release a connection based upon a device traffic inactivity timer.

An embodiment method 500 using a device traffic inactivity timer to determine when to release a network connection is illustrated in FIG. 5. When the mobile device is operating with an open connection to a telecommunications network, an adaptive fast dormancy controller process executing on a processor of the mobile device may activate a device traffic inactivity timer in block 506. As described above, this inactivity timer may count down to zero from a predetermined duration value or count up from zero for the predetermined duration.

In block 508, the processor may monitor the applications executing on the processor for network activity, such as the sending or receiving of data packets over the open connection.

In determination block 510, the processor may determine, based on this monitoring, whether an application has initiated network traffic activity. If the processor detects network traffic activity by one or more applications (i.e., determination block 510="Yes"), the processor may reset the device traffic inactivity timer in block 512, and return to block 508 to continue monitoring network traffic activity by applications. So long as the processor does not detect further network traffic activity (i.e., determination block 510="No"), the device traffic inactivity timer may continue to run and the processor may monitor whether the timer to detect when it expires in determination block 514. So long as the device traffic inactivity timer has not expired (i.e., determination block 514="No"), the processor may continue to monitor applications for network traffic activity in block 508. When the device traffic inactivity timer expires (i.e., determination block 514="Yes"), the processor may interpret this as an indication that the applications executing on the mobile device have ended their use of the network connection, at least for the time being. In that case, the processor may pause for a short delay in optional block 520, and then transmit a connection release message to the telecommunications network in block 522. In block 524, the processor may update the device traffic inactivity timer value based on measurements or considerations, some samples of which are described below with reference to FIGS. 9 through 12B.

Figure 6:
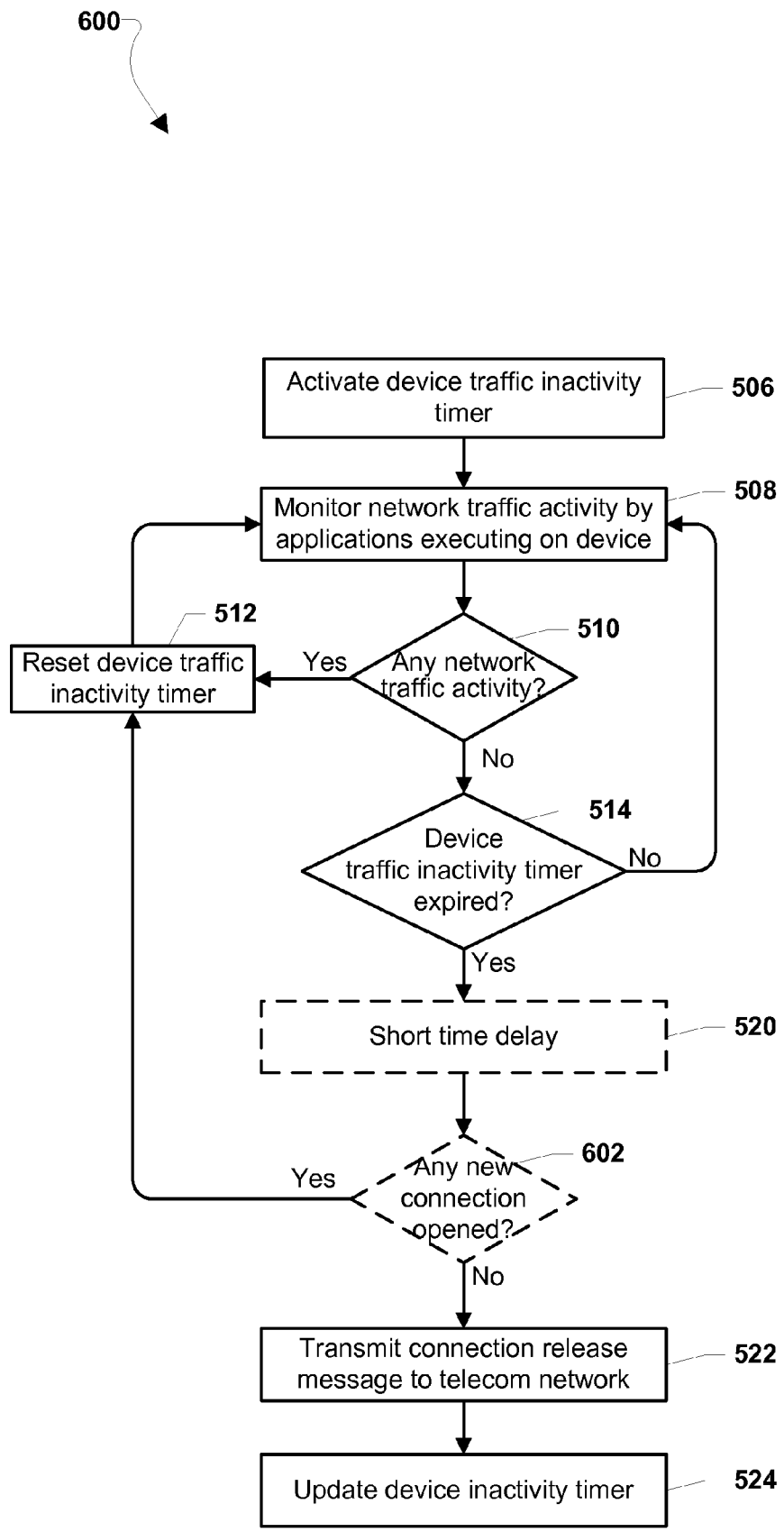

In an optional embodiment method 600 illustrated in FIG. 6, after expiration of the short time delay in block 520, the processor may double check in determination block 602 whether any new connections have been opened during the short time delay or whether there are other indications of current or impending network activity. If so (i.e., determination block 602="Yes"), the processor may terminate transmission of a connection release message and reset the device traffic inactivity timer in block 512 before returning to block 508 to continue monitoring traffic activity of applications executing on the device. If no new connections have been opened and there is no other indication of impending network traffic activity (i.e., determination block 602="No"), the processor may proceed to transmit the connection release message in block 522 and update the device traffic inactivity timer in block 524 as described above with reference to FIG. 5A.

As mentioned above, in some embodiments more than one device traffic inactivity timer may be implemented within the adaptive fast dormancy controller. Using multiple device traffic inactivity timers may allow greater flexibility for detecting when network connections have become inactive while accommodating the different network activity patterns of various applications that may be executing on the device processor. Multiple device traffic inactivity timers may be implemented with different timer durations, and applications executing on the processor may be tied to specific device traffic inactivity timers according to their network activity patterns. For example, applications that exhibit longer periods between network activity events may be assigned to device traffic inactivity timers with longer timer durations, while applications which typically interact frequently with the network while actively communicating may be assigned to device traffic inactivity timers with shorter durations. In another embodiment, a separate device traffic inactivity timer may be used for timing inactivity of each application executing on the processor. In these embodiments, the adaptive fast dormancy controller may monitor all of the various device traffic inactivity timers and request termination of a network connection only when all of the device traffic inactivity timers have expired.

Figure 7:
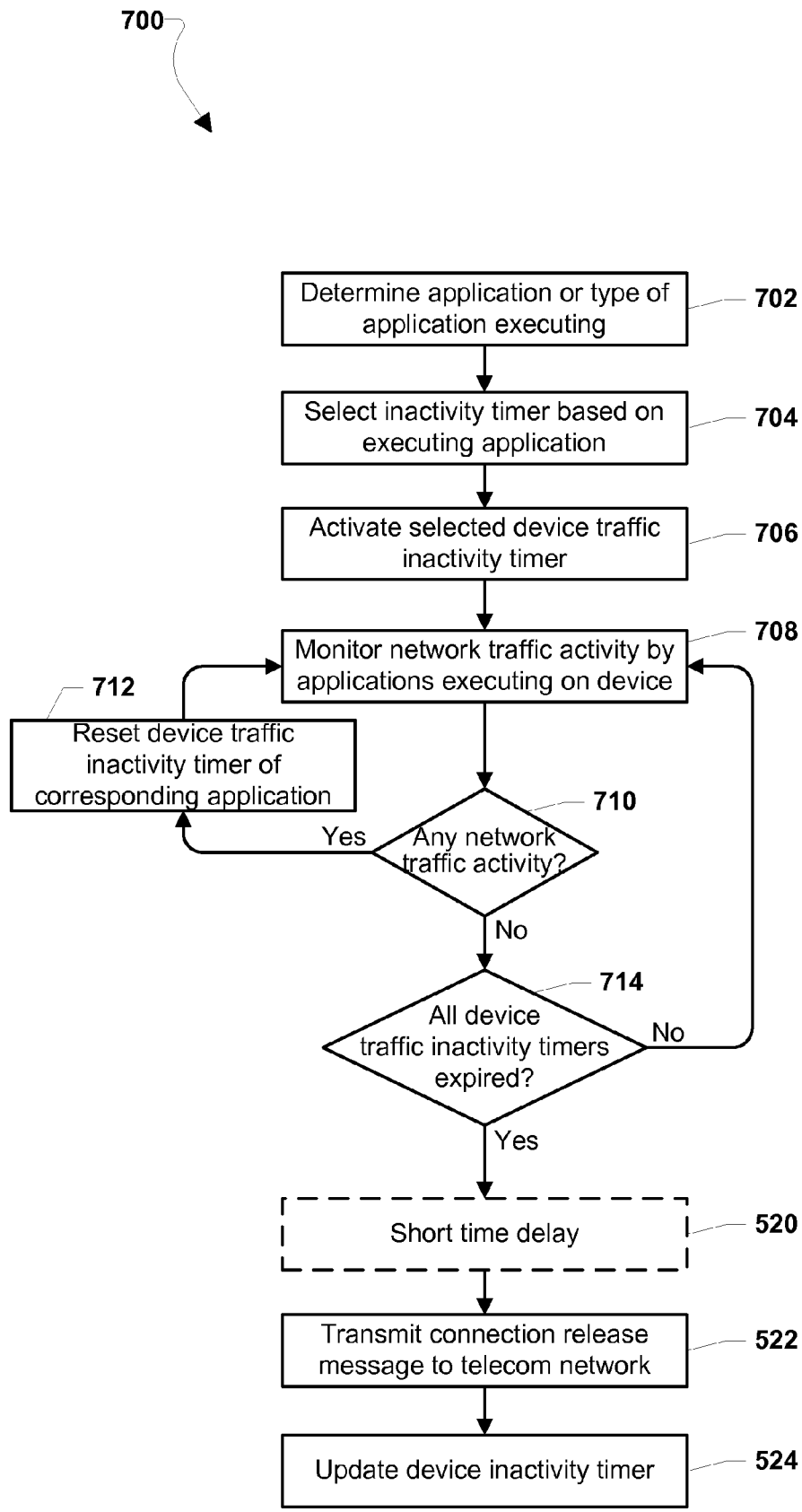
FIG. 7 is a process flow diagram of an embodiment method for determining when to release a network connection based upon a plurality of device traffic inactivity timers monitoring a plurality of applications executing on a mobile device.

FIG. 7 illustrates an embodiment method 700 that implements a plurality of device traffic inactivity timers. In block 702, the mobile device processor may identify the application or applications executing on the processor and utilizing an open connection to the telecommunications network. Alternatively, in block 702 the processor may determine the types of application being executed and accessing the open connection to the network, with the application types depending upon network access characteristics. For example, applications may be characterized based upon whether they typically access the network relatively frequently or infrequently while actively utilizing an open communication connection.

In block 704, the processor may then select a particular device traffic inactivity timer for each application based on the application or type of application determined in block 702. In this manner, applications that access a network connection frequently may be assigned a device traffic inactivity timer with a relatively short time duration so that the adaptive fast dormancy controller will promptly detect when such applications have stopped using the open connection. On the other hand, applications that access the network connection less frequently or irregularly while actively utilizing an open communication connection may be assigned to a device traffic inactivity timer with a relatively long time duration so that the adaptive fast dormancy controller will avoid prematurely closing an open connection for an application actively communicating with the network.

The timer selected for each application in block 704 is activated in block 706. Several of the application-specific (or application type-specific) device traffic inactivity timers may be running simultaneously when multiple applications are using an open network connection.

While a device traffic inactivity timer is counting, the processor may monitor the corresponding application executing on the processor in determination block 710 to determine whether an application has begun network traffic activity. When multiple applications are utilizing an open communication connection, the processor may be monitoring each of the multiple applications in blocks 708 and 710 to recognize when/if each application initiates another traffic activity event. If the processor determines that an application has initiated further network traffic activity (i.e., determination block 710="Yes"), the processor may reset the device traffic inactivity timer corresponding to that application in block 712, and return to block 708 to monitor the network traffic activity of that application. The processor may also continue to monitor the network traffic activity of other applications whose device traffic inactivity timers are still running by also continuing to perform the monitoring operations in block 708.

So long as an application corresponding to a device traffic inactivity timer does not restart network traffic activity (i.e., determination block 710="No"), the processor may monitor all of the device traffic inactivity timers to determine whether all timers have expired in determination block 714. So long as at least one device traffic inactivity timer remains actively counting down or counting up (i.e., determination block 714="No"), the processor may continue to monitor network traffic activity by those applications corresponding to active timers in block 708. When all device traffic inactivity timers have expired (i.e., determination block 714="Yes"), the processor may transmit a connection release message to the telecommunications network and update one or more of the device traffic inactivity timers as described above with reference to blocks 520 through 524 in FIG. 5A.

In addition to monitoring applications executing on the device processor, the adaptive fast dormancy controller functionality may also take into account the user's interactions with the mobile device. If the user is actively interacting with the device, such as interacting with a user interface, this may indicate that a network communication may occur soon, and therefore a prompt termination of an open connection based solely on application network activity may not be appropriate. To accommodate user interactions with a mobile device, the adaptive fast dormancy controller functionality may use a different duration for the device traffic inactivity timer when the user is actively engaged with the device than when the user is not currently interacting with the device. In this manner, the mobile device may delay requesting termination of an open connection when the user is engaged with the mobile device so that the device is more responsive to user interactions that require network communications. When the processor determines that the user is not actively engaged with the mobile device (e.g., the mobile device is still and/or no user inputs have been received on a user interface within a predetermined duration), the adaptive fast dormancy controller may use a shorter device traffic inactivity timer duration in order to more quickly close an open connection so as to conserve battery power and promptly released network resources.

Figure 8:
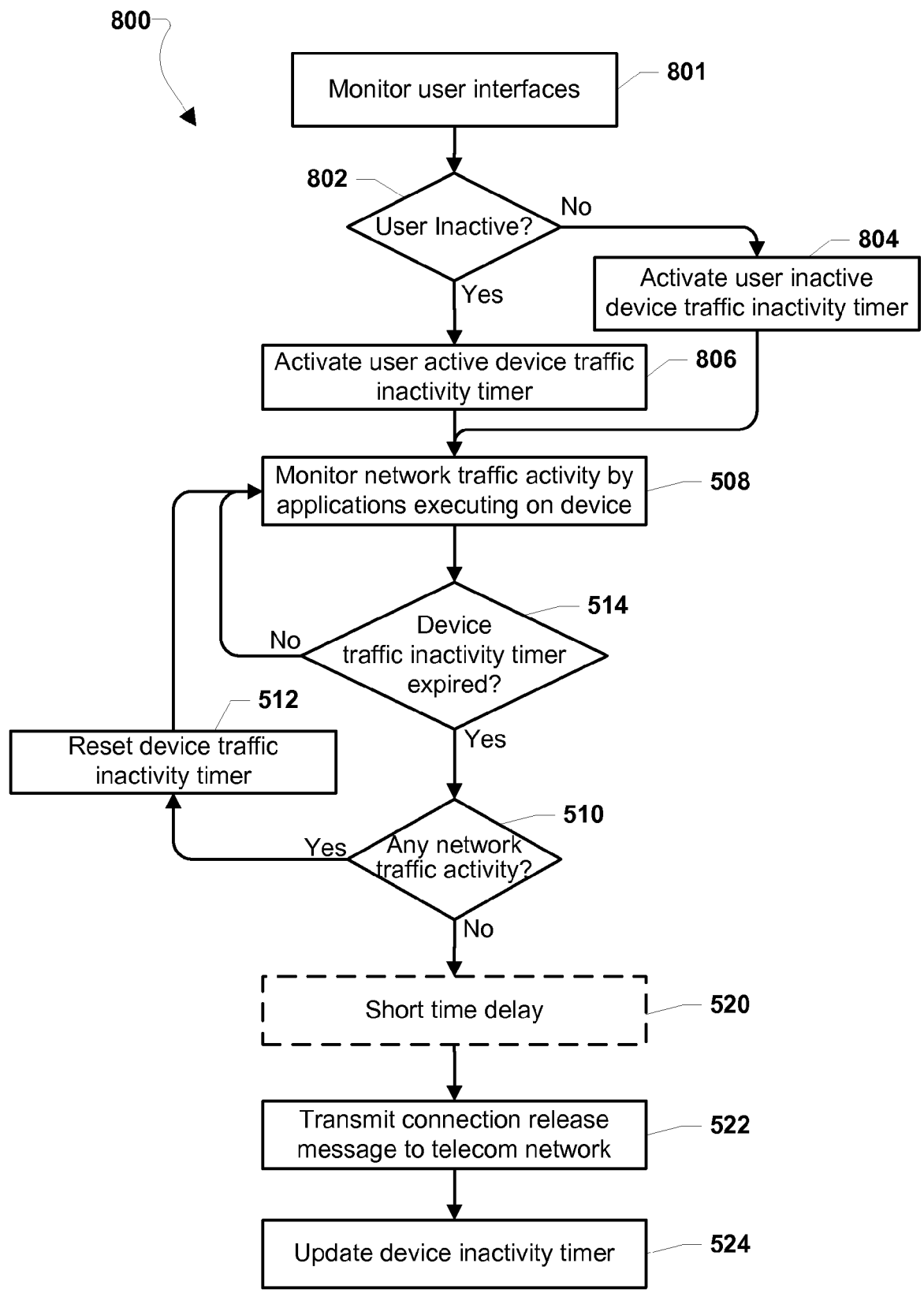
FIG. 8 is a process flow diagram of an embodiment method for determining when to release a network connection based upon the device traffic inactivity timers that depend on whether a user is actively engaged with the mobile device.

FIG. 8 illustrates an embodiment method 800 that takes into account the user's interactions with the mobile device as part of the adaptive fast dormancy controller functionality. The processor may monitor user interfaces (e.g., buttons, touchscreen, etc.) in block 801 and determine whether the user is actively interfacing with the mobile device in determination block 802. Such a determination may be based upon the time since the last user interaction with a user interface (e.g., a touch event on a touchscreen display, a button press, etc.). This determination may also be based upon other information available to the processor, such as accelerometer data (which may indicate whether the mobile device is in the possession of the user), the specific applications executing on the processor, the images currently presented on the display (which may indicate whether the user is actively viewing something on the display, such as text or a video) and combinations of such information (e.g., acceleration data indicating the user is handling the mobile device while text is being displayed may indicate that the user is actively engaged with the device).

If the processor determines that the user is not actively engaged with the mobile device (i.e., determination block 802="No"), the processor may activate a user-inactive device traffic inactivity timer in block 804 that has a relatively short duration. On the other hand, if the processor determines that the user is actively engaged with the mobile device (i.e., determination block 802="Yes"), the processor may activate a user-active device traffic inactivity timer in block 806 that has a relatively long duration compared to the timer set in block 804. Thereafter, the operations of method 800 may proceed in blocks 508 through 524 as described above with reference to FIG. 5A.

The longer duration of the user-active device traffic inactivity timer activated in block 806 may accommodate the normal delay between user interactions with a user interface due to normal human response time, enabling the network connection to remain open while a user types a message or otherwise interacts with the device. Keeping the connection open while the user is interacting with the mobile device may enhance the user experience by enabling network communications to be responsive to user inputs. On the other hand, using a shorter duration for the user-inactive device traffic inactivity timer when the user is not actively engaged with the mobile device may be acceptable because even if the open connection is released prematurely, the user experience is unlikely to be impacted by the added delay of reestablishing the connection.

As mentioned above, the adaptive fast dormancy controller may adapt to current applications and/or network conditions in order to continuously strike a balance between responsiveness and conservation of battery power and network resources. Three mechanisms by which the fast dormancy controller may adapt to current conditions are described below. However, other mechanisms may be used for updating the device traffic inactivity timers in response to applications and network conditions.

As described above with reference to FIG. 7, one mechanism for adapting to the current applications executing on the device processor is to assign device traffic inactivity timers with different durations to specific applications or types of applications. As described above, this enables the adaptive fast dormancy controller to accommodate the different network activity patterns of various applications in a manner that is responsive to the application actually executing on the processor at a given instant. For example, the embodiment method 700 described above with reference to FIG. 7 may use shorter countdown durations for applications that typically interact frequently via an open connection when they are actively engaged in communications, enabling the processor to more rapidly release a network connection at the end of a communication session by such applications. As another example, embodiment method 700 may use longer countdown durations for applications that typically interact with a network over a longer time spans or with an irregular frequency to ensure that a network connection is not released prematurely. The use of multiple device traffic inactivity timers in this manner enables the adaptive fast dormancy controller functionality to adapt to the mix of applications executing on the processor from minute to minute.

Figure 10:
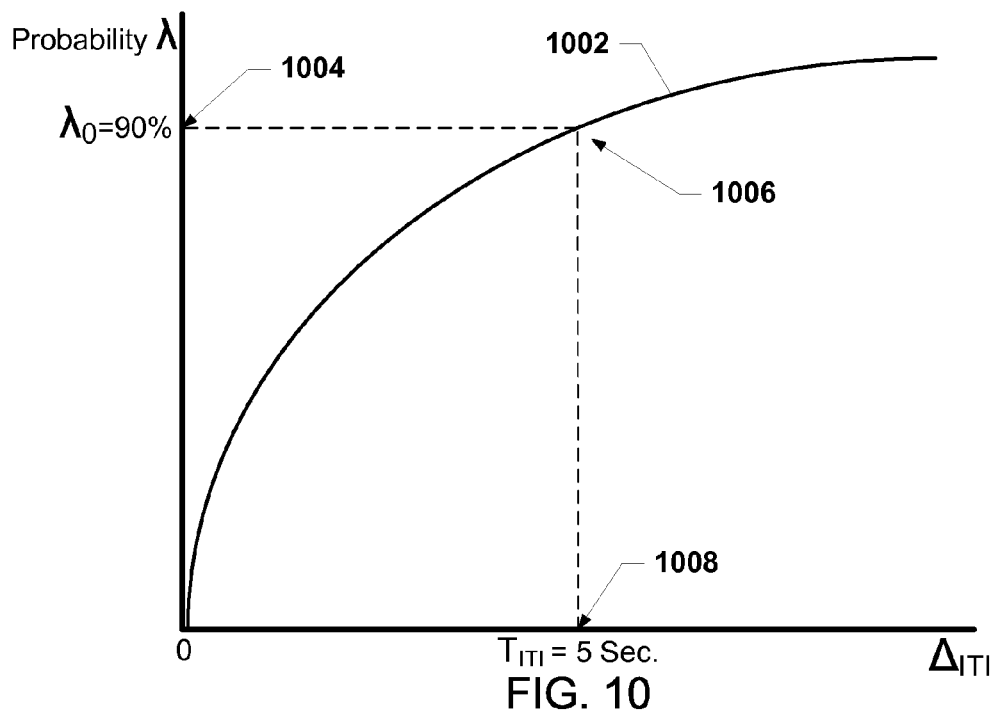
FIG. 10 is a graph illustrating use of a cumulative probability curve of inter-activity interval data for selecting a duration for a device traffic inactivity timer according to an embodiment.
Figure 11:
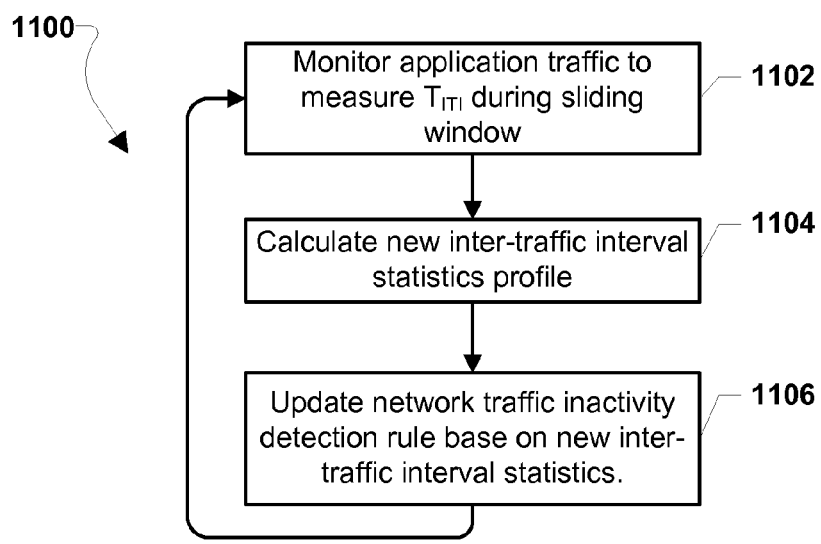
FIG. 11 is a process flow diagram of an embodiment method for adjusting rules for detecting network traffic inactivity based upon measured inter-activity intervals obtained during a window of time.

Another mechanism for adapting to current applications and/or network conditions involves observing the durations of the inter-activity time intervals, and selecting a time duration for the device traffic inactivity timer that is calculated to encompass most of the normal interactivity time intervals, within a design parameter, so that the decision to release an open connection based on the timer duration will be correct most of the time. This embodiment mechanism is illustrated in FIGS. 9 through 11.

Figure 9:
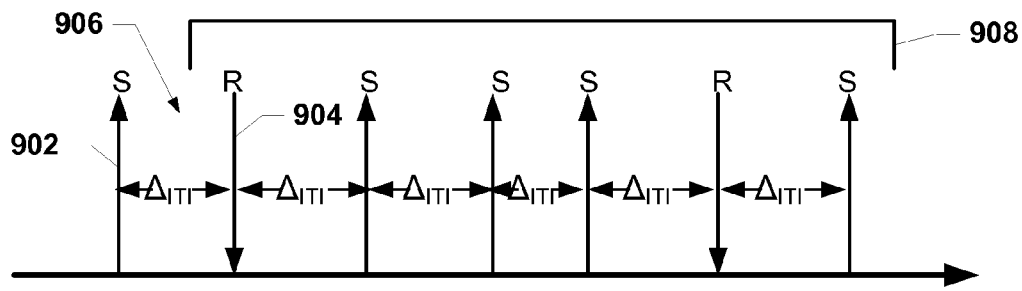
FIG. 9 is a timeline diagram illustrating network activity events, inter-activity intervals and a sliding time window used for analyzing inter-activity intervals.

FIG. 9 is a timeline diagram illustrating an example of the timing of network traffic activity events 902, 904 in order to illustrate the terminology used in describing this embodiment. An application communicating with a network through an open connection will typically send data packets (illustrated as up arrows labeled with an S) to the network and receive data packets (illustrated as down arrows labeled with an R) from the network. Each event of sending or receiving a data packet is referred to herein as a traffic activity event. The interactivity time interval ($\Delta_{ITI}$) 906, which is the time between any two traffic activity events 902, 904, may be measured each time a traffic activity event is detected. An application actively communicating with the network via an open connection will send and receive data packets (i.e., exhibit traffic activity events) with a range of interactivity time intervals as illustrated in FIG. 9.

In order to adapt the fast dormancy controller to the interactivity time intervals exhibited by currently executing applications under current network conditions, the mobile device processor may observe the interactivity time intervals $\Delta_{ITI}$ within a sliding window of time 908 ("sliding time window") to develop a characterization (e.g., durations and variability) of the current interactivity time intervals. Using a sliding time window 908 for analyzing the current interactivity time intervals enables the processor to characterize the current activity patterns, thereby enabling the adaptive fast dormancy controller to adapt to changes in network and application conditions.

In an embodiment, the adaptive fast dormancy controller may adaptively update the statistic and the device traffic inactivity timer values. For example, the adaptive fast dormancy controller may update the statistic values on the next traffic request by adjusting the observation window in a "sliding window" fashion, adding the latest "n" $\Delta_{ITI}$ (s) to the observation set, removing the oldest "n" $\Delta_{ITI}$ (s) from the observation set, and re-calculating the device traffic inactivity timer. The value "n" may be chosen to have either a fast or slow update rate.

In an embodiment, at the end of the monitoring time window, the adaptive fast dormancy controller may obtain the initial value of the device traffic inactivity timer $T_{ITI}$ by solving the following equation:

$$\text{Prob.}(\Delta_{ITI} \leq T_{ITI}) = \lambda_0 \qquad \text{Eq. 1,}$$

where the value of $\lambda_0$ may be an application-specific value less than 1.0 obtained from interactivity time intervals $\Delta_{ITI}$ behavior studies and/or based on various usage scenarios.

A variety of statistical analysis methods may be used for characterizing the interactivity time intervals $\Delta_{ITI}$ within a sliding window 908 in order to adjust the device traffic inactivity timer durations to suit current network and application circumstances. FIG. 10 illustrates one embodiment method for characterizing interactivity time intervals $\Delta_{ITI}$ within a sliding window of time and using such characterization to set the duration for a device traffic inactivity timer (i.e., solving Eq. 1). Specifically, FIG. 10 illustrates a cumulative probability curve 1002 that may be calculated based upon the observed interactivity time intervals $\Delta_{ITI}$ within the sliding window. Such a cumulative probability curve plots the cumulative fraction of interactivity time intervals within the time window on the vertical axis against the duration of interactivity time interval. Thus, the cumulative probability curve 1002 enables an estimation of the probability that the application has stopped using an open connection as a function of the time since the last network activity event.

FIG. 10 also illustrates how the cumulative probability curve 1002 can be used to select a duration for a device traffic inactivity timer. By selecting a desired probability $\lambda$ 1004 that a decision to release an open network connection is correct (i.e., the application has the finished using the connection), the intersection 1006 of this value with the cumulative probability curve 1002 can be used to identify the corresponding interactivity time interval 1008. Since the cumulative probability curve 1002 is based upon interactivity time intervals 906 observed within a moving window of time 908, the responsiveness of the adaptive fast dormancy controller can adapt to current application and/or network conditions while satisfying predetermined network availability performance characteristics.

The desired probability value $\lambda$ 1004 used in this method may be a design parameter set by an application developer or a network operator, and may be adjusted based upon user preferences (e.g., whether the user wants a more reliable data connection or longer battery life). In an embodiment, the desired probability value $\lambda$ 1004 used in the method illustrated in FIG. 10 may depend upon other factors, such as whether the user is currently interacting with the mobile device. For example, if the processor determines that the user is currently interacting with the mobile device, as described above with reference to block 802 in FIG. 8, the desired probability value $\lambda$ 1004 may be greater than is the case when the processor determines that the user is not interacting with the mobile device, since the impact on the user experience of prematurely releasing an open connection is greater when the user is actively using the device. In another embodiment, the desired probability value $\lambda$ 1004 used in the method illustrated in FIG. 10 may depend upon network conditions, such as using any lower desired probability value $\lambda$ 1004 when the network is overloaded and thus there is a need to free up network resources whenever possible.

Other statistical methods may also be used to adjust the device traffic inactivity timer based upon observed interactivity time intervals $\Delta_{ITI}$. For example, the device traffic inactivity timer value may be selected based upon a number of standard deviations from the average interactivity time interval calculated based on the interactivity time intervals $\Delta_{ITI}$ observed within a moving window of time 908. For example, the device traffic interactivity timer value may be set as the average interactivity time interval plus two standard deviations. In that case, releasing an open connection after expiration of that time interval would be expected to be premature or in error only about 8% of the time.

Alternatively or in addition, the adaptive fast dormancy controller may adjust the inter-traffic interval statistic value corresponding to round trip time to the cellular telecommunication network.

FIG. 11 illustrates an embodiment method 1100 for modifying or updating device traffic inactivity timers based on interactivity time intervals observed during a sliding window of time. In block 1102, the mobile device processor may monitor application network activity events to measure the interactivity time intervals during a sliding window of time. This may involve tallying the number of interactivity time intervals within the window of time by the interval durations in a manner that enables statistical analysis of the data, such as generating a cumulative probability curve as illustrated in FIG. 10 or calculating other statistic values (e.g., average and standard deviations). In block 1104, the processor may calculate a new interactivity statistics profile or statistic values. In an embodiment, as part of block 1104, the processor may adjust the inter-traffic interval statistic values to account for the round trip time to the cellular telecommunication network. In block 1106, the processor may update the network traffic inactivity detection rule based on the interactivity time interval statistics calculated in block 1104. This process may be performed repeatedly by returning to block 1102 to repeat the calculations based upon observations within the sliding window at a subsequent instant in time (i.e., over a new window of time).

The traffic inactivity detection rule that is determined in block 1106 based on the interactivity time interval statistics calculated in block 1104 may include updating the duration of one or more device traffic inactivity timers as described above. Thus, the updated rule would, in effect, be that inactivity is detected when the time since the last network activity event exceeds the duration determined based on the interactivity time interval statistics, such as described above with reference to FIG. 10. The traffic inactivity detection rule may also or alternatively involve selecting a particular device traffic inactivity timer with a duration best matching the interactivity time interval statistics.

A third mechanism for adapting the fast dormancy controller to application and/or network conditions involves continuing to observe the network activities of applications after a determination is made and adjusting a device traffic inactivity timer according to whether a previous determination was correct. In this manner, the adaptive fast dormancy controller may continually learn from its own decisions regarding whether applications have seized communicating in order to improve the next determination. This embodiment mechanism or method may include determining an objective rate of premature release decisions (which may be a parameter set by a network operator or based on settings applied by an application developer or user), calculating an observed rate of premature release decisions from one or more requests of network connection release outcomes, calculating a difference between the observed rate of premature release decisions and the objective rate of premature release decisions, and updating the device traffic inactivity timer based on the calculated difference between the observed rate of premature release decisions and the objective rate of premature release decisions. In embodiment, calculating the observed rate of premature release decisions from one or more requests of network connection release outcomes may include calculating the observed rate of premature release decisions from the outcomes of fixed number of requests of network connection release. Calculating the observed rate of premature release decisions from one or more requests of network connection release outcomes may include calculating the observed rate of premature release decisions from all outcomes of past requests of network connection release. Calculating the observed rate of premature release decisions from one or more requests of network connection release outcomes may include calculating the observed rate of premature release decisions from the outcomes of requests of network connection release within the observation time window. Updating the device traffic inactivity timer based on the calculated difference between the observed rate of premature release decisions and the objective rate of premature release decisions may include updating the device inactivity timer in proportion to the calculated the difference between the observed rate of premature release decisions and the objective rate of premature release decisions. Updating the device traffic inactivity timer based on the calculated difference between the observed rate of premature release decisions and the objective rate of premature release decisions may include updating the device inactivity timer by a fixed factor based on the calculated the difference between the observed rate of premature release decisions and the objective rate of premature release decisions. Updating the device traffic inactivity timer based on the calculated difference between the observed rate of premature release decisions and the objective rate of premature release decisions may include updating the device inactivity timer by a time-varying factor based on the calculated the difference between the observed rate of premature release decisions and the objective rate of premature release decisions.

Figure 12A:
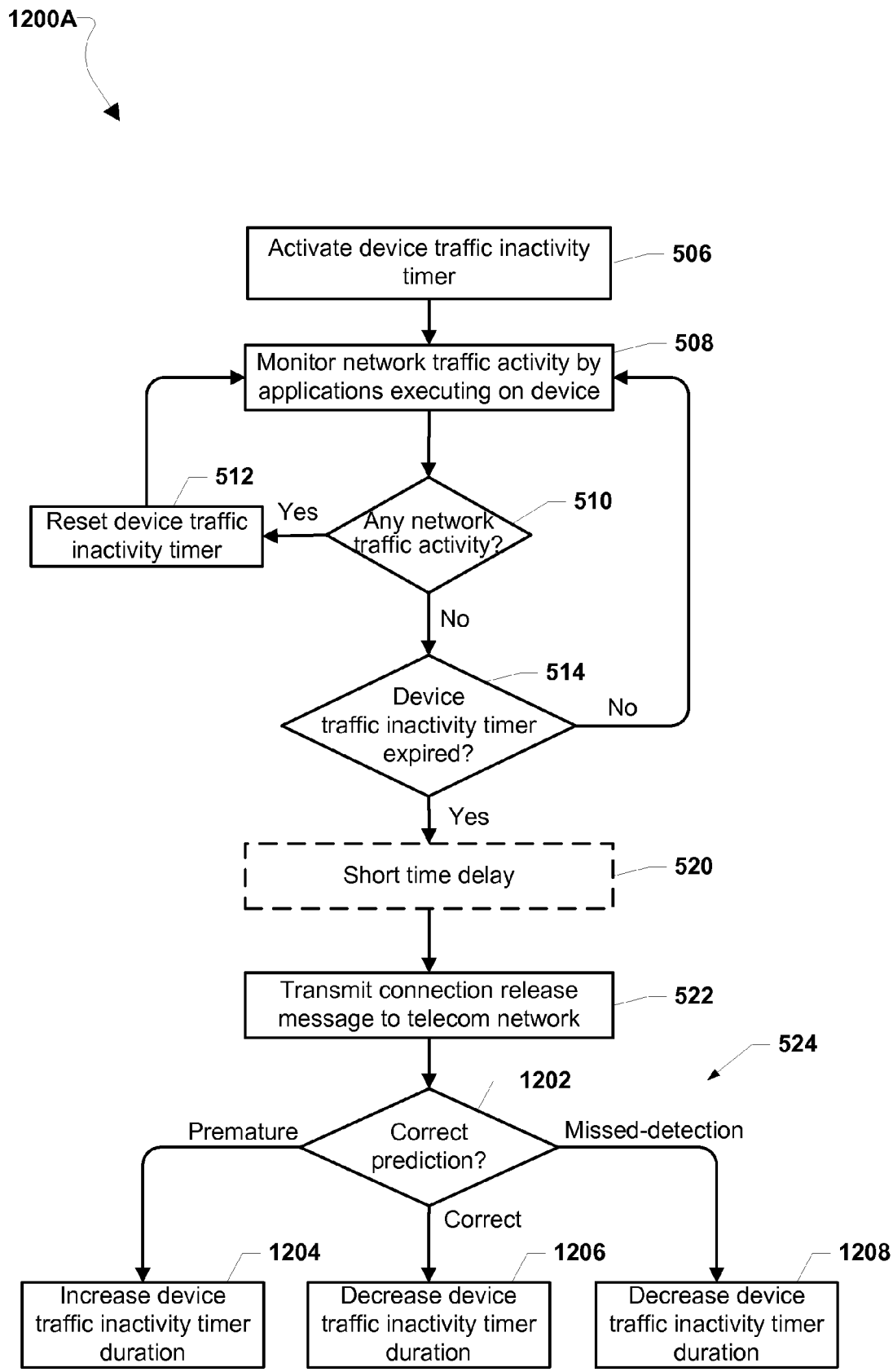
FIGS. 12A and 12B are process flow diagrams of embodiment methods for adjusting device traffic inactivity timers based on whether previous decisions to release a network connection were correct.

FIG. 12A illustrates an embodiment method 1200A for adjusting a device traffic inactivity timer according to whether a previous determination was correct. In method 1200A, the processor may monitor application network traffic activity and determine when to transmit a connection release message in blocks 506 through 522 as described above with reference to FIG. 5A. In determination block 1202, the processor may observe past and subsequent network activity by the application(s) to determine whether the adaptive fast dormancy controller process had correctly predicted that the application had ended communications via the open network connection. This determination may be made periodically and/or after the decision is made to transmit a connection release message. For example, the processor may monitor network activity by the application(s) after transmitting a connection release message in order to determine whether the application promptly initiated network activity following a decision to transmit a connection release message, which would indicate that the detection was premature (a false alarm). Also, the processor may analyze previous activity by the application and/or the duration between two network activity events to determine whether the application had ended network activity well before the decision was made to transmit a connection release message, which would indicate that the timer was set at such a long duration that an opportunity to release the connection to save power was missed (a missed detection).

Based on the determination made in determination block 1202, the processor may adjust one or more device traffic inactivity timers in blocks 1204, 1206 and 1208. In embodiment method 1200A, the processor may increase a device traffic inactivity timer duration in block 1204 when the processor determines that the previous decision was premature, decrease a device traffic inactivity timer duration in block 1208 when the processor determines that the previous decision missed detecting an opportunity to release the connection, and decrease the device traffic inactivity timer duration in block 1206 when the processor determines that the previous decision was correct. In this manner, the adaptive fast dormancy controller may continually adjust towards shorter decision durations to respond to changing application and/or network conditions that enable faster detections of applications that have stopped using an open connection.

The processor implementing the adaptive fast dormancy controller may increase the device traffic inactivity timer value by a first amount in response to determining that the connection was released prematurely (i.e., in response to a false alarm) in block 1204, and decrease the device traffic inactivity timer value by a second amount that is less than the first amount in response to determining that the process has failed to recognize when the application had stopped using the connection (i.e., in response to a missed-detection) in block 1208. This difference in the amount by which the timer is adjusted may account for the differing impact on the user experience of prematurely closing a connection, which can cause the mobile device to appear less responsive to the user, compared to not recognizing when a connection can be closed, which may result in a small additional battery drain that the user is unlikely to notice.

Figure 12B:
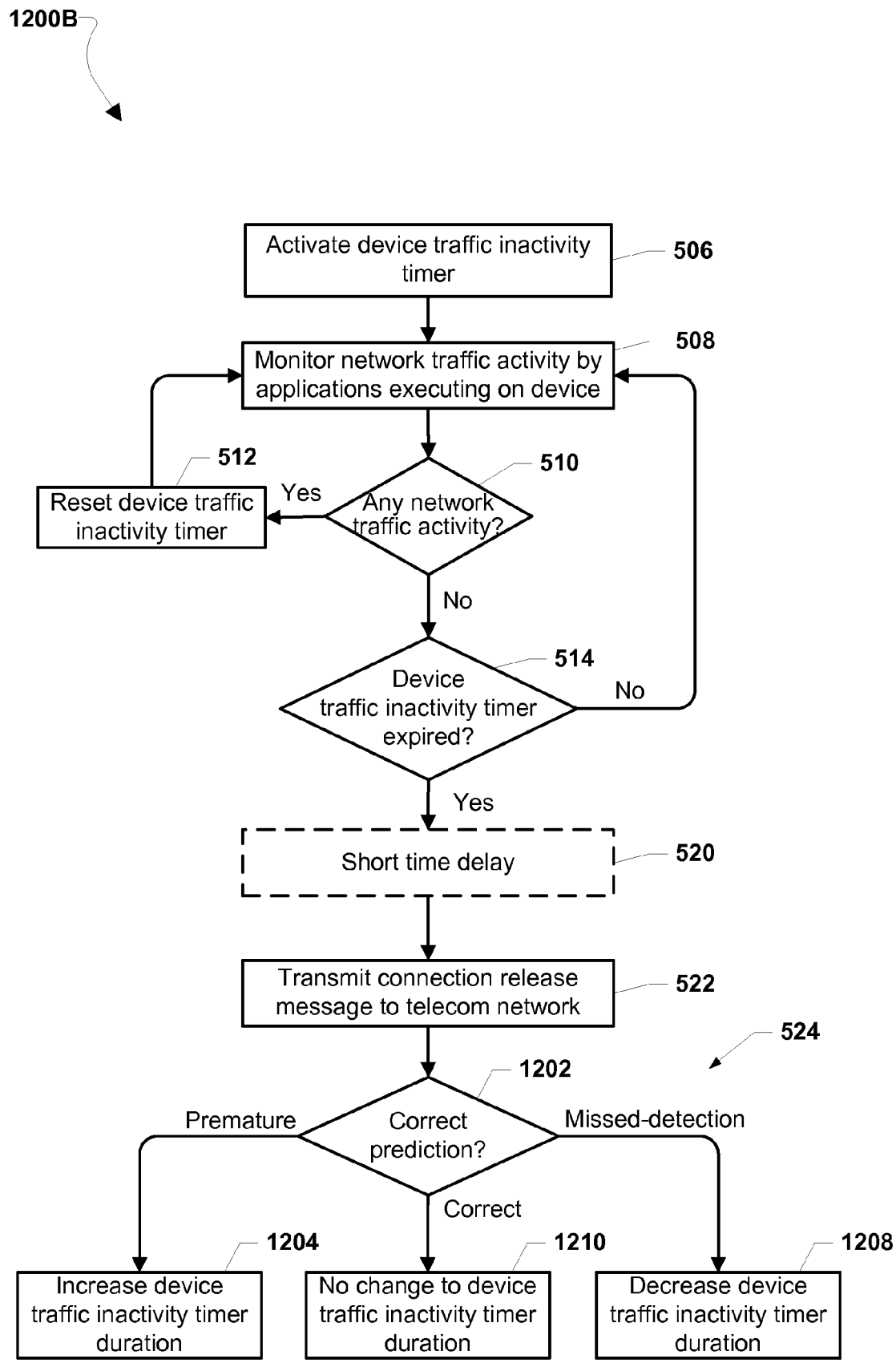

FIG. 12B illustrates an alternative embodiment method 1200B for adjusting a device traffic inactivity timer according to whether the determination was correct. Embodiment method 1200B is substantially the same as embodiment method 1200A described above with the exception that the processor may make no change to the device traffic inactivity timer duration in block 1210 when the processor determines that the previous decision was correct.

In an embodiment, the amount by which the device traffic inactivity timer is increased may differ from the amount by which the value is decreased in such adjustments. For example, in situations where a false alarm is more harmful than a missed-detection, the adaptive fast dormancy controller may be configured such that the device traffic inactivity timer is adjusted more aggressively when increasing the value than when decreasing the value. This adaptive approach may effectively recognize the behavior change of the applications and adjust itself through time (e.g., email periodic sync-up→user interaction→periodic sync-up).

The amount by which the device traffic inactivity timer is increased or decreased in response to determinations of accurate or premature release decisions may be calculated based upon design parameters and modeled or experimentally determined increments to provide a rapid convergence to a range of device traffic inactivity timer values that balances energy saving performance against responsiveness to changes in application and network conditions. Instead of gathering observations of inter-activity intervals and performing the calculations necessary to develop a cumulative probability curve (or similar statistical measure) characterizing the current network activity behavior of the mobile device, an iterative adjustment process may be implemented based on stochastic approximation methods. To accomplish this, a stochastic approximation algorithm may be used for finding a zero of a function $g(\theta)$ based on noisy observations of the function given by:

$$\theta^{(m+1)}=\theta^{(m)}+\epsilon g^{(m)}$$

where the outcome in time increment m of $g^{(m)}$ is a noisy observation of $g(\theta^{(m)})$. Applied to selecting an appropriate device traffic inactivity timer value, $\theta$ is the duration of that timer in a particular instant m, and $\theta^{(m+1)}$ is the timer value for the next instant after adjusting $\theta^{(m)}$ by the small value of $\epsilon$ times the observed result $g^{(m)}$.

To use the stochastic approximation algorithm, the objective is to find a zero of the equation:

$$g(\theta)=P_{pre}(\theta)-P_{th},$$

where $P_{pre}(\theta)$ is the instantaneous probability of a premature prediction that the communication session is finished, and $P_{th}$ is the design threshold for premature predictions.

In an embodiment, sliding moving average (SMA) method can be used to calculate $P_{pre}(\theta)$. Presuming that the inter-activity intervals vary somewhat randomly within a range, within N samples there will be M instances in which release of a connection was premature when that decision is based on a device traffic inactivity timer of duration $\theta$, and thus the probability of a premature decision $P_{pre}(\theta)$ on average will be M/N, and:

$$g(\theta)=M/N-P_{th}.$$

So taking a simple to implement algorithm for incrementally adjusting the device traffic inactivity timer value $\theta$ using stochastic approximation is given by the equation:

$$\theta^{(m+1)}=\theta^{(m)}+\epsilon(M/N-P_{th}).$$

The value of N and M can be determined by examining the outcomes of a fixed number of requests of network connection release, or all outcomes of past requests of network connection release, or the outcomes of requests of network connection release within the observation time window.

As one particular example, if the sample size N is 1 (i.e., an instantaneous response algorithm is used), then M will be either 1 when the decision is premature or 0 when the decision is correct. Thus, in a stochastic algorithm to adjust the device traffic inactivity timer value based on observations of the previous determination, either $\theta^{(m+1)}a=\theta^{(m)}+\epsilon(1-P_{th})$ if the decision to release the connection was premature or $\theta^{(m+1)}=\theta^{(m)}-\epsilon P_{th}$ if the decision was correct. For ease of reference $\Delta_1$, the amount by which the device traffic inactivity timer value is increased when the previous decision is determined to be premature, is equal to $\epsilon(1-P_{th})$ and $\Delta_2$, the amount by which the device traffic inactivity timer value is decreased when the previous decision is determined to be correct, is equal to $\epsilon P_{th}$. From these equations it can be seen that the ratio of $\Delta_1$ to $\Delta_2$ is $$\Delta_1/\Delta_2=1/P_{th}-1.$$

For example, if the design rate of premature release decisions is five percent (5%), which there be one premature release out of twenty release decisions on average, then $\Delta_1=19\Delta_2$. As another example, if the design rate of premature release decisions is ten percent (10%), then $\Delta_1=9\Delta_2$. The value of $\Delta_2$ is then the product of $\epsilon P_{th}$ which is a value that may be determined based on modeling and/or experimentation. A suitable value of $\Delta_2$ or the step size $\epsilon$ may be a few tens of milliseconds to a few seconds, such as approximately 400 milliseconds.

While the foregoing description assumed a sample size of N=1, a larger number of samples may be used for incrementing the device traffic inactivity timer value. Using a small sample size, such as N=1, results in an algorithm that quickly converges toward a range close to an equilibrium value (i.e., provides quick response); however, the value will fluctuate significantly about an equilibrium value due to the random nature of the inter-activity interval in most circumstances. Using a larger sample size, such as N=5, results in an algorithm that more closely varies about an equilibrium value due to the smoothing effect of the larger sample size; however, the algorithm will be slower to respond to changes in the application and/or network conditions. To take advantage of these characteristics, in an embodiment, the algorithm used to determine the step size for the stochastic mechanism may use a sample size of N=1 or 2 initially and after a change in application/network conditions is observed, and then revert to using a larger sample size after convergence is achieved to reduce the fluctuation about the equilibrium value for the device traffic inactivity timer.

In another embodiment, an exponential moving average method may be used to calculate the probability of a premature prediction as $$P_{pre}(\theta,n)=\alpha*P_{pre,inst}(\theta,n)+(1-\alpha)*P_{pre}(\theta,n-1),$$

where: $P_{pre}(\theta, n)$ and $P_{pre}(\theta, n-1)$ are the filtered probabilities of a premature prediction at $t_n$ and $t_{n-1}$, respectively; $P_{pre,inst}(\theta, n)$ is the instantaneous observation of the premature prediction probability at $t_n$, which takes the value of 1 when the decision is premature or 0 when the decision is correct; and $\alpha$ is a design parameter between 0 and 1 that weighs more on the instantaneous observation of the premature prediction probability if $\alpha$ is closer to 1, while on the other hand, it weighs more on the history of the premature prediction probability if $\alpha$ is closer to 0. The stochastic algorithm for adjusting the device traffic inactivity timer described above is also sensitive to the step size $\epsilon$ used. Using a larger value for $\epsilon$ results in an algorithm that quickly converges toward a range close to an equilibrium value (i.e., provides quick response); however, the value will fluctuate significantly about the equilibrium value due to the large step size. Using a smaller step size $\epsilon$ results in an algorithm that varies less about an equilibrium value due to the smaller step size; however, the algorithm will be slower to converge since each step toward the equilibrium that is taken is smaller, and thus the algorithm will be slow to respond to changes in the application and/or network conditions. To take advantage of these characteristics, in an embodiment, the step size used in the stochastic algorithm may initially be large, and then be changed to a smaller value after a number of cycles or when near equilibrium (e.g., characterized by random changes about an average value) is observed in order to reduce the fluctuation about the equilibrium value for the device traffic inactivity timer.

Figure 13A:
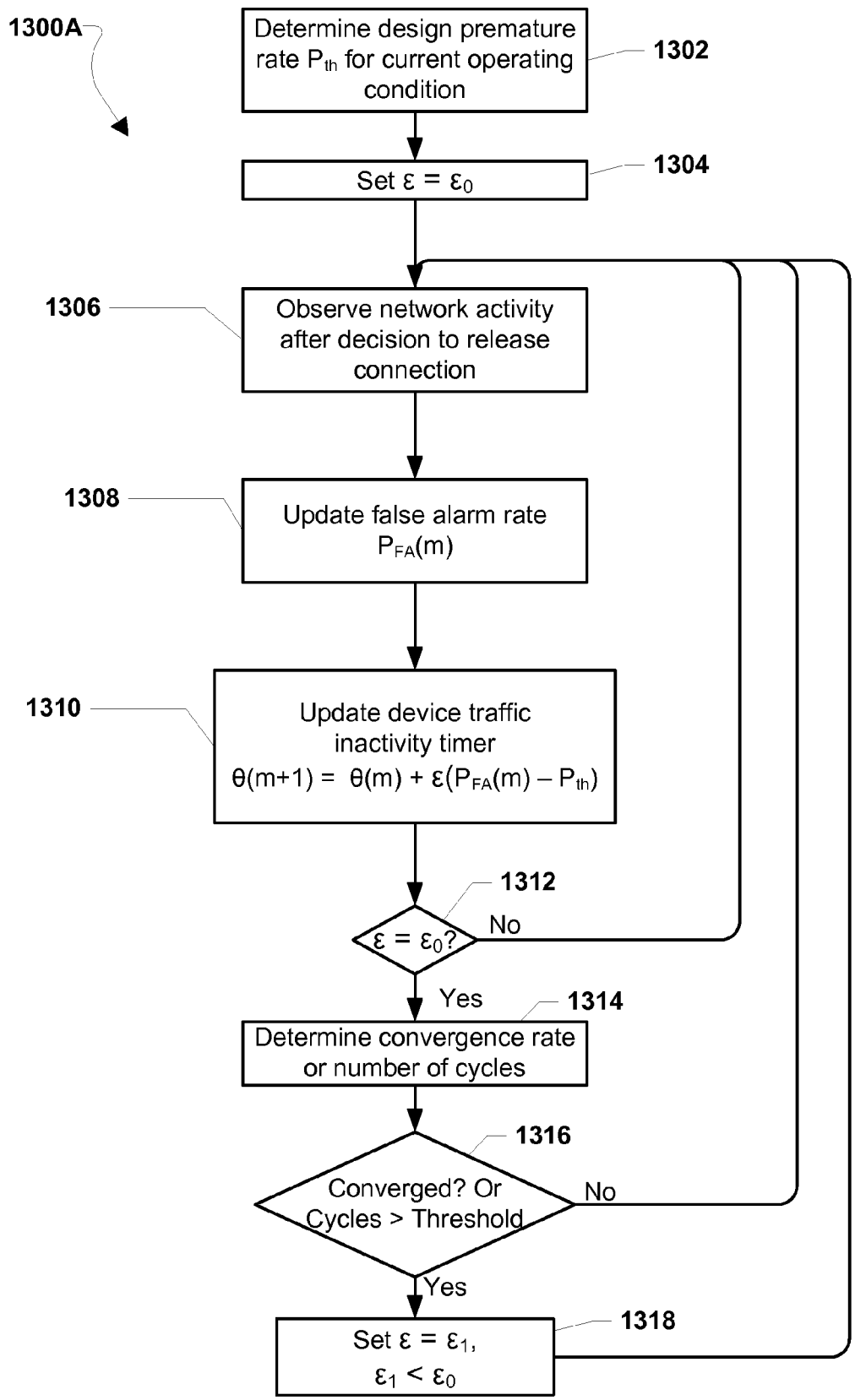
FIG. 13 is a process flow diagram of an embodiment method for adjusting a device traffic inactivity timer value based on observing whether previous release decisions were correct or premature using a stochastic algorithm.

FIG. 13A illustrates an embodiment method 1300A that may be used to adjust a device traffic inactivity timer based upon the stochastic approximation approach. At the start of operations or in response to determining a change in status of the mobile device (e.g., detecting that a user is actively engaged with the mobile device) a design rate of premature connection release decisions may be determined in block 1302. In essence, this value is the rate of premature releases or false alarms by the fast dormancy operation that a designer, network operator or user setting defines is acceptable. This determination may depend upon the time of day, the current mobile device status, or the location of the mobile device, each of which may influence the degree of responsiveness that is desirable for the mobile device. For example, if the user is actively engaged with the mobile device, then a low rate of premature connection releases may be desired, since such incorrect decisions may degrade the user experience due to reduced responsiveness that may result from the delay caused by the extra signaling required to reconnect to the network. On the other hand, if the user has laid the mobile device down or the mobile device is in a holster (conditions which may be determined based on accelerometers or holster sensors), there may be little impact on user experience from prematurely releasing an open connection. In that case the design or acceptable rate of premature release decisions may be higher in order to more quickly release open connections, thereby conserving battery power. Similarly, the acceptable rate of premature release decisions may be higher when the mobile device is located far from home (and thus far from an opportunity to charge the battery), or after work hours when the user may not be focused on important tasks. Thus, whenever such a change in mobile device circumstances is recognized, the mobile device processor may return to block 1302 to determine the correct rate of premature decisions to use in the fast dormancy operation.

In block 1304, the processor may set an initial step size $\epsilon$ for use in a stochastic algorithm for adjusting the device traffic inactivity timer. The initial step size $\epsilon$ may be a default value that may be determined by the designer or network operator based on modeling and/or experimentation. The initial step size $\epsilon_0$ selected in block 1304 may be a relatively large value in order to enable a fast converging algorithm, and thus a process that quickly responds to the current application and/or network conditions.

In block 1306, the processor may observe network activity after a connection release decision is made in order to determine whether the decision was correct or premature. In block 1308, the false alarm rate may be updated, such as by using the sliding window moving average method or the exponential moving average method described above, and in block 1310, the device traffic inactivity timer may be updated correspondingly.

After adjusting the device traffic inactivity timer value, the processor may determine whether the step size should be changed, such as by executing the operations in block 1312 through 1318. For example, in determination block 1312, the processor may determine whether the current step size is equal to the initial step size $\epsilon_0$ in order to recognize whether the algorithm has adjusted for convergence. In this example, if the current step size $\epsilon$ is not equal to the initial step size $\epsilon_0$ (i.e., determination block 1312="No"), this would indicate that the algorithm has already adjusted for convergence, and therefore the processor may return to block 1306 and continue adjusting the device traffic inactivity value without changes to the step size.

If the current step size $\epsilon$ is equal to the initial step size $\epsilon_0$ (i.e., determination block 1312="Yes"), this would indicate that the algorithm has not yet adjusted for convergence, and therefore the processor may perform block 1314 to either determine whether the algorithm has converged towards an equilibrium value or a predefined number of cycles have been completed. Convergence towards an equilibrium value may be recognized by determining a trend in a number of the previous device traffic inactivity timer values. When the device traffic inactivity timer values vary about a relatively constant average, and thus exhibit little in the way of a trend, this indicates that the algorithm has converged towards an equilibrium value. Instead of performing such calculations, the algorithm may simply be configured to perform the adjustments in block 1306 through 1314 for a predetermined number of cycles that are estimated to result in convergence about an equilibrium value, at least in most circumstances. In determination block 1316, the processor may determine whether the algorithm has converged or the predetermined number of cycles has been exceeded. So long as the algorithm has not converged or exceeded the predetermined number of cycles (i.e., determination block 1316="No"), the processor may return to block 1306 to continue observing network activity after release decisions and adjusting the device traffic inactivity timer in block 1310 as described above.

When the processor determines that the algorithm has converged or the predefined number of cycles have been completed (i.e., determination block 1316="Yes"), the processor may set the step size to a smaller step size appropriate for adjusting the device traffic inactivity timer value after the algorithm has converged. The processor may return to block 1306 and use the new step size subsequently.

The method described above with reference to FIG. 13A provides a simple to implement algorithm that provides for quick adjustments of the device traffic inactivity timer that enables the adaptive fast dormancy operation to respond to changes in the application and/or network conditions. Using this method, the processor of a mobile device may quickly arrive at a device traffic inactivity timer value that provides approximately the same user experience and battery power savings as achieved using the more computationally intensive process described above with reference to FIGS. 10 and 11.

Figure 13B:
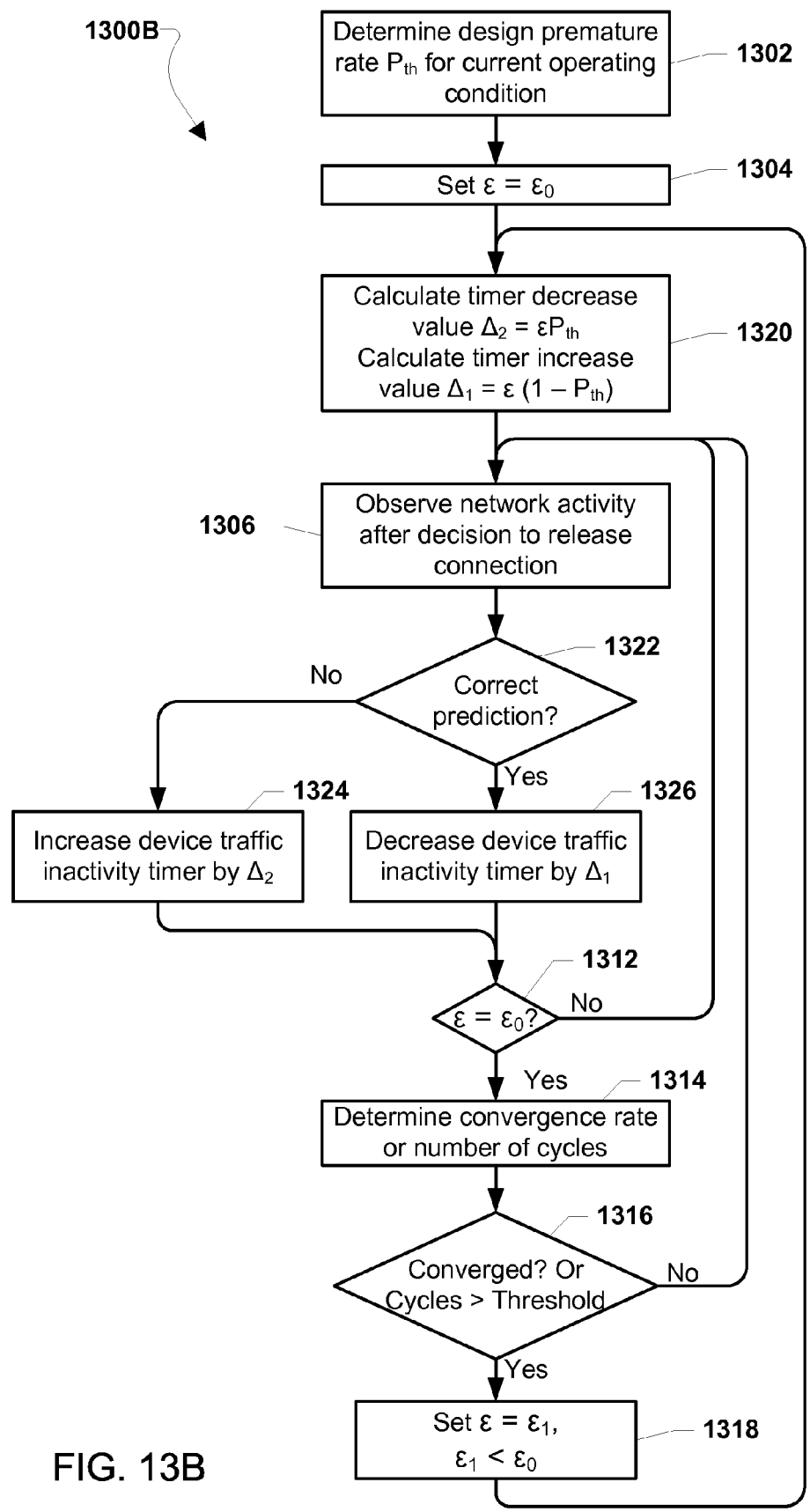

FIG. 13B illustrates an embodiment method 1300B that may be used to adjust a device traffic inactivity timer where the false alarm rate is estimated by a sliding window average method with window size N=1 (i.e., the instantaneous response algorithm described above). Embodiment 1300B is substantially the same as embodiment 1300A, with the exception of operations in blocks 1320-1326. In block 1320, the processor may calculate the timer decrease value $\Delta_1$ to be applied when a correct connection release decision is made by the fast dormancy operation, and a timer increase value $\Delta_2$ to be applied when a premature connection release decision is made by the fast dormancy operation. If a correct connection release decision was made (i.e., determination block 1322="Yes"), in block 1326, the processor may decrease the device traffic inactivity timer value by $\Delta_1$. On the other hand, if the previous connection release decision was premature (i.e., determination block 1322="No"), in block 1324, the processor may increase the device traffic inactivity timer by $\Delta_2$.

Network operators may benefit from the various embodiments by providing a mechanism that will reduce network demands by speeding the release of connections. Mobile devices also benefit from the adaptive fast dormancy controller as instead of going to Idle, the network can also put them into Cell-/URA-PCH state, which will shorten the latency when returning to a fully active state than would be the case from the Idle state.

In an embodiment, the module may associate application traffic by the application with one or more behavior modes, detect a current behavior mode of the application, and adjust one of the fast dormancy device traffic inactivity timer value and the inter-traffic interval statistic value in response to the current behavior mode.

Figure 14:
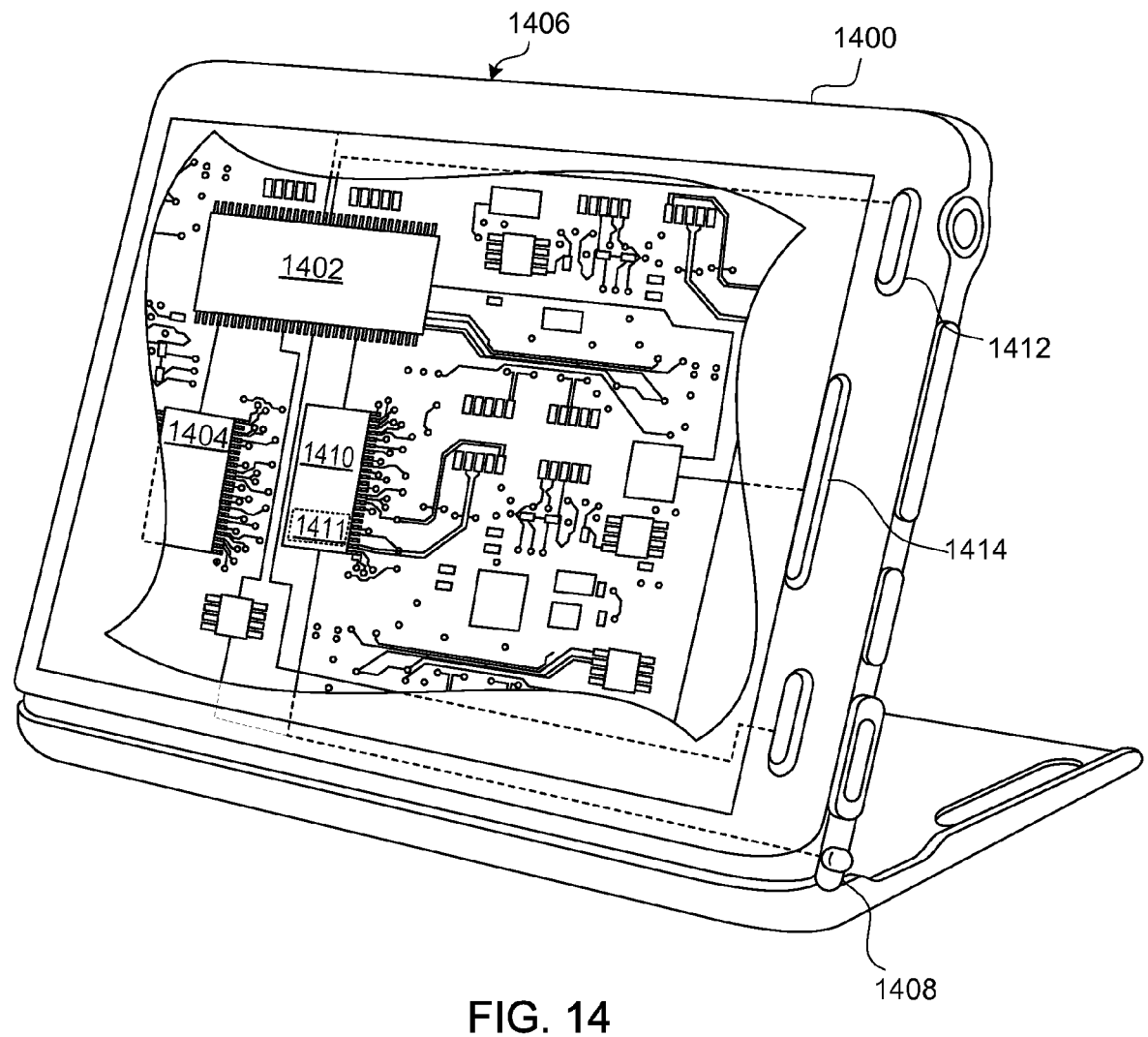
FIG. 14 is a component block diagram of a mobile device suitable for use with various embodiments.

The various embodiments may be implemented in any of a variety of mobile devices, an example of which is illustrated in FIG. 14. For example, a mobile device 1400 that executes an operating system including an adaptive fast dormancy controller 110 (FIG. 1) by including a processor 1402 coupled to internal memory 1404. Internal memory 1404 may include volatile or non-volatile memories, and may also be secure and/or encrypted memories, or unsecure and/or unencrypted memories, or any combination thereof. The processor 1402 may also be coupled to a touch screen display 1406, such as a resistive-sensing touch screen, capacitive-sensing touch screen, infrared sensing touch screen, or the like. Additionally, the display 1406 of the mobile device 1400 need not have touch screen capability. Additionally, the mobile device 1400 may have one or more antennas 1408 for sending and receiving electromagnetic radiation that may be connected to a wireless transceiver 1410 coupled to the processor 1402. The mobile device 1400 may also include physical buttons 1412 and 1414 for receiving user inputs.

The wireless transceiver 1410 may also include one or more processors, such as a modem processor 1411 and a digital signal processor (not shown separately) within the transceiver chip. Also, the mobile device processor 1402 may be a multi-core processor, and the mobile device may include more than one processor (not shown separately but substantially similar in structure), such as one processor accomplishing system operations and another processor executing applications. The various embodiments may be implemented in any one or combinations of processors 1402, 1411 that may be included within the mobile device.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable or processor-executable storage medium. The steps or operations of a method or algorithm disclosed herein may be embodied in a processor-executable software module, which may reside on a non-transitory processor-readable storage medium. Non-transitory processor-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of non-transitory processor-readable storage media. Additionally, the operations of a method or algorithm may reside as one or any combination or set of codes and/or instructions on a non-transitory machine readable medium and/or processor-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for changing a communication state of a mobile device in a wireless telecommunication network, comprising:
    determining whether a user is interacting with the mobile device;
    setting a time duration of a device traffic inactivity timer such that a length of the time duration is based upon whether the user is interacting with the mobile device, wherein the time duration of the device traffic inactivity timer is set to a first time duration in response to determining that the user is interacting with the mobile device and a second time duration that is shorter than the first time duration in response to determining that the user is not interacting with the mobile device;
    monitoring network traffic activity by applications executing on the mobile device;
    determining when use of a network connection has ended based on expiration of the device traffic inactivity timer;
    sending a connection release message to the wireless telecommunications network to request release of the network connection on behalf of the applications in response to determining that use of the network connection has ended; and
    updating the device traffic inactivity timer.

2. The method of claim 1, wherein determining when use of the network connection has ended based on expiration of a device traffic inactivity timer comprises determining when use of the network connection has ended based on expiration of a single device traffic inactivity timer used for all applications on the mobile device.

3. The method of claim 1, wherein determining when use of the network connection has ended based on expiration of a device traffic inactivity timer comprises determining when use of the network connection has ended based on expiration of a plurality of device traffic inactivity timers, wherein respective ones of the plurality of device traffic inactivity timers time inactivity of different applications executing on the mobile device.

4. The method of claim 3, wherein at least one of the plurality of device traffic inactivity timers times inactivity of a particular application executing on the mobile device selected based on a frequency of network activity events by the particular application.

5. The method of claim 3, further comprising determining whether more than one application is running simultaneously, wherein determining when use of the network connection has ended based on a device traffic inactivity timer comprises determining when all of the plurality of device traffic inactivity timers have expired when more than one application is running simultaneously.

6. The method of claim 3, wherein at least two of the plurality of device traffic inactivity timers expire after different time durations, the method further comprising:
    selecting one of the plurality of device traffic inactivity timers based upon whether the user is interacting with the mobile device.

7. The method of claim 1, further comprising:
    determining whether an application has a persistent end-to-end connection via the wireless telecommunication network; and
    delaying transmission of the connection release message to the wireless telecommunication network by a short delay in response to i) determining that the application does not have a persistent end-to-end connection and ii) receiving a signal from the application indicating that the network connection is to be released.

8. The method of claim 7, further comprising:
    receiving a signal from the application indicating that the connection is to be released;
    determining whether the network connection is being used for an on-going service;
    determining whether an upcoming periodic event for the on-going service is scheduled to occur after a network timeout time of a network inactivity timer in response to determining that the connection is being used for an on-going service; and
    sending the connection release message in response to determining that the upcoming periodic event occurs after the network timeout time.

9. The method of claim 1, wherein updating the device traffic inactivity timer comprises:
    monitoring application traffic by the applications during a sliding time window;
    calculating an inter-traffic interval statistic value based on the application traffic within the sliding time window; and
    updating a value of the device traffic inactivity timer according to the calculated inter-traffic interval statistic value.

10. The method of claim 9, further comprising adjusting the inter-traffic interval statistic value based on a round trip time to the wireless telecommunication network.

11. The method of claim 1, wherein updating the device traffic inactivity timer comprises:
    monitoring application traffic by a group of applications during a sliding time window;
    calculating an inter-traffic interval statistic value based on the application traffic within the sliding time window; and
    updating a value of the device traffic inactivity timer associated with the group of applications according to the calculated inter-traffic interval statistic value.

12. The method of claim 1, wherein updating the device traffic inactivity timer comprises:
    determining whether a previous request of a network connection release correctly determined that a network connection should be released;
    increasing a value of the device traffic inactivity timer in response to determining that the previous request of the network connection release prematurely released the network connection; and
    decreasing the value of the device traffic inactivity timer in response to determining that the mobile device previously missed an opportunity to release the network connection.

13. The method of claim 12, wherein updating the device traffic inactivity timer further comprises decreasing the value of the device traffic inactivity timer in response to determining that the previous request of the network connection release correctly determined that the network connection should be released.

14. The method of claim 12, wherein:
increasing the value of the device traffic inactivity timer in response to determining that the previous request of the network connection release prematurely released the network connection comprises increasing the value of the device traffic inactivity timer by a first amount;
decreasing the value of the device traffic inactivity timer in response to determining that the mobile device previously missed an opportunity to release the network connection comprises decreasing the value of the device traffic inactivity timer by a second amount; and
wherein the second amount is less than the first amount.

15. The method of claim 1, further comprising:
determining an objective rate of premature release decisions;
calculating an observed rate of premature release decisions from outcomes of one or more requests of network connection release;
calculating a difference between the observed rate of premature release decisions and the objective rate of premature release decisions; and
updating the device traffic inactivity timer based on the calculated difference between the observed rate of premature release decisions and the objective rate of premature release decisions.

16. The method of claim 15, wherein calculating the observed rate of premature release decisions from the outcomes of one or more requests of network connection release comprises calculating the observed rate of premature release decisions from outcomes of a fixed number of requests of network connection release.

17. The method of claim 15, wherein calculating the observed rate of premature release decisions from the outcomes of one or more requests of network connection release comprises calculating the observed rate of premature release decisions from all outcomes of past requests of network connection release.

18. The method of claim 15, wherein calculating the observed rate of premature release decisions from the outcomes of one or more requests of network connection release comprises calculating the observed rate of premature release decisions from outcomes of requests of network connection release within an observation time window.

19. The method of claim 15, wherein updating the device traffic inactivity timer based on the calculated difference between the observed rate of premature release decisions and the objective rate of premature release decisions comprises updating the device inactivity timer in proportion to the calculated the difference between the observed rate of premature release decisions and the objective rate of premature release decisions.

20. The method of claim 19, wherein updating the device traffic inactivity timer based on the calculated difference between the observed rate of premature release decisions and the objective rate of premature release decisions comprises updating the device traffic inactivity timer by a fixed factor based on the calculated difference between the observed rate of premature release decisions and the objective rate of premature release decisions.

21. The method of claim 19, wherein updating the device traffic inactivity timer based on the calculated difference between the observed rate of premature release decisions and the objective rate of premature release decisions comprises updating the device traffic inactivity timer by a time-varying factor based on the calculated difference between the observed rate of premature release decisions and the objective rate of premature release decisions.

22. The method of claim 21, wherein the time-varying factor is determined according to the calculated difference between the observed rate of premature release decisions and the objective rate of premature release decisions.

23. A mobile device, comprising:
a wireless transceiver configured to establish a communication connection with a wireless telecommunications network; and
a processor coupled to the wireless transceiver and configured with processor-executable instructions to perform operations comprising:
determining whether a user is interacting with the mobile device;
setting a time duration of a device traffic inactivity timer such that a length of the time duration is based upon whether the user is interacting with the mobile device, wherein the time duration of the device traffic inactivity timer is set to a first time duration in response to determining that the user is interacting with the mobile device and a second time duration that is shorter than the first time duration in response to determining that the user is not interacting with the mobile device;
monitoring network traffic activity by applications executing on the mobile device;
determining when use of a network connection has ended based on expiration of the device traffic inactivity timer;
sending a connection release message to the wireless telecommunications network to request release of the network connection on behalf of the applications in response to determining that use of the network connection has ended; and
updating the device traffic inactivity timer.

24. The mobile device of claim 23, wherein the processor is configured with processor-executable instructions to perform operations such that determining when use of the network connection has ended based on expiration of a device traffic inactivity timer comprises determining when use of the network connection has ended based on expiration of a single device traffic inactivity timer used for all applications on the mobile device.

25. The mobile device of claim 23, wherein the processor is configured with processor-executable instructions to perform operations such that determining when use of the network connection has ended based on expiration of a device traffic inactivity timer comprises determining when use of the network connection has ended based on expiration of a plurality of device traffic inactivity timers, wherein respective ones of the plurality of device traffic inactivity timers time inactivity of different applications executing on the mobile device.

26. The mobile device of claim 25, wherein the processor is configured with processor-executable instructions to perform operations such that at least one of the plurality of device traffic inactivity timers times inactivity of a particular application executing on the mobile device selected based on a frequency of network activity events by the particular application.

27. The mobile device of claim 25, wherein the processor is configured with processor-executable instructions to perform operations further comprising determining whether more than one application is running simultaneously, and wherein the processor is configured with processor-executable instructions to perform operations such that determining when use of the network connection has ended based on a device traffic inactivity timer comprises determining when all of the plurality of device traffic inactivity timers have expired when more than one application is running simultaneously.

28. The mobile device of claim 25, wherein the processor is configured with processor-executable instructions to perform operations such that at least two of the plurality of device traffic inactivity timers expire after different time durations, and
wherein the processor is configured with processor-executable instructions to perform operations further comprising:
selecting one of the plurality of device traffic inactivity timers based upon whether the user is interacting with the mobile device.

29. The mobile device of claim 23, wherein the processor is configured with processor-executable instructions to perform operations further comprising:
determining whether an application has a persistent end-to-end connection via the wireless telecommunication network; and
delaying transmission of the connection release message to the wireless telecommunication network by a short delay in response to i) determining that the application does not have a persistent end-to-end connection and ii) receiving a signal from the application indicating that the network connection is to be released.

30. The mobile device of claim 29, wherein the processor is configured with processor-executable instructions to perform operations further comprising:
receiving a signal from the application indicating that the connection is to be released;
determining whether the network connection is being used for an on-going service;
determining whether an upcoming periodic event for the on-going service is scheduled to occur after a network timeout time of a network inactivity timer in response to determining that the connection is being used for an on-going service; and
sending the connection release message in response to determining that the upcoming periodic event occurs after the network timeout time.

31. The mobile device of claim 23, wherein the processor is configured with processor-executable instructions to perform operations such that updating the device traffic inactivity timer comprises:
monitoring application traffic by the applications during a sliding time window;
calculating an inter-traffic interval statistic value based on the application traffic within the sliding time window; and
updating a value of the device traffic inactivity timer according to the calculated inter-traffic interval statistic value.

32. The mobile device of claim 31, wherein the processor is configured with processor-executable instructions to perform operations further comprising adjusting the inter-traffic interval statistic value based on a round trip time to the wireless telecommunication network.

33. The mobile device of claim 23, wherein the processor is configured with processor-executable instructions to perform operations such that updating the device traffic inactivity timer comprises:
monitoring application traffic by a group of applications during a sliding time window;
calculating an inter-traffic interval statistic value based on the application traffic within the sliding time window; and
updating a value of the device traffic inactivity timer associated with the group of applications according to the calculated inter-traffic interval statistic value.

34. The mobile device of claim 23, wherein the processor is configured with processor-executable instructions to perform operations such that updating the device traffic inactivity timer comprises:
determining whether a previous request of network connection release correctly determined that a network connection should be released;
increasing a value of the device traffic inactivity timer in response to determining that the previous request of network connection release prematurely released the network connection; and
decreasing the value of the device traffic inactivity timer in response to determining that the mobile device previously missed an opportunity to release the network connection.

35. The mobile device of claim 34, wherein the processor is configured with processor-executable instructions to perform operations such that updating the device traffic inactivity timer further comprises decreasing the value of the device traffic inactivity timer in response to determining that the previous request of the network connection release correctly determined that the network connection should be released.

36. The mobile device of claim 34, wherein the processor is configured with processor-executable instructions to perform operations such that:
increasing the value of the device traffic inactivity timer in response to determining that the previous request of the network connection release prematurely released the network connection comprises increasing the value of the device traffic inactivity timer by a first amount;
decreasing the value of the device traffic inactivity timer in response to determining that the mobile device previously missed an opportunity to release the network connection comprises decreasing the value of the device traffic inactivity timer by a second amount; and
wherein the second amount is less than the first amount.

37. The mobile device of claim 23, wherein the processor is configured with processor-executable instructions to perform operations further comprising:
determining an objective rate of premature release decisions;
calculating an observed rate of premature release decisions from outcomes of one or more requests of network connection release;
calculating a difference between the observed rate of premature release decisions and the objective rate of premature release decisions; and
updating the device traffic inactivity timer based on the calculated difference between the observed rate of premature release decisions and the objective rate of premature release decisions.

38. The mobile device of claim 37, wherein the processor is configured with processor-executable instructions to perform operations such that calculating the observed rate of premature release decisions from the outcomes one or more requests of network connection release comprises calculating the observed rate of premature release decisions from outcomes of a fixed number of requests of network connection release.

39. The mobile device of claim 37, wherein the processor is configured with processor-executable instructions to perform operations such that calculating the observed rate of premature release decisions from the outcomes of one or more requests of network connection release comprises calculating the observed rate of premature release decisions from all outcomes of past requests of network connection release.

40. The mobile device of claim 37, wherein the processor is configured with processor-executable instructions to perform operations such that calculating the observed rate of premature release decisions from the outcomes of one or more requests of network connection release comprises calculating the observed rate of premature release decisions from outcomes of requests of network connection release within an observation time window.

41. The mobile device of claim 37, wherein the processor is configured with processor-executable instructions to perform operations such that updating the device traffic inactivity timer based on the calculated difference between the observed rate of premature release decisions and the objective rate of premature release decisions comprises updating the device traffic inactivity timer in proportion to the calculated difference between the observed rate of premature release decisions and the objective rate of premature release decisions.

42. The mobile device of claim 41, wherein the processor is configured with processor-executable instructions to perform operations such that updating the device traffic inactivity timer based on the calculated difference between the observed rate of premature release decisions and the objective rate of premature release decisions comprises updating the device traffic inactivity timer by a fixed factor based on the calculated difference between the observed rate of premature release decisions and the objective rate of premature release decisions.

43. The mobile device of claim 41, wherein the processor is configured with processor-executable instructions to perform operations such that updating the device traffic inactivity timer based on the calculated difference between the observed rate of premature release decisions and the objective rate of premature release decisions comprises updating the device traffic inactivity timer by a time-varying factor based on the calculated difference between the observed rate of premature release decisions and the objective rate of premature release decisions.

44. The mobile device of claim 43, wherein the processor is configured with processor-executable instructions to perform operations such that the time-varying factor is determined according to the calculated difference between the observed rate of premature release decisions and the objective rate of premature release decisions.

45. A mobile device, comprising:
means for determining whether a user is interacting with the mobile device;
means for setting a time duration of a device traffic inactivity timer such that a length of the time duration is based upon whether the user is interacting with the mobile device, wherein the time duration of the device traffic inactivity timer is set to a first time duration in response to determining that the user is interacting with the mobile device and a second time duration that is shorter than the first time duration in response to determining that the user is not interacting with the mobile device;
means for monitoring network traffic activity by applications executing on the mobile device;
means for determining when use of a network connection has ended based on expiration of the device traffic inactivity timer;
means for sending a connection release message to a wireless telecommunications network to request release of the network connection on behalf of the applications in response to determining that use of the network connection has ended; and
means for updating the device traffic inactivity timer.

46. The mobile device of claim 45, wherein means for determining when use of the network connection has ended based on expiration of a device traffic inactivity timer comprises means for determining when use of the network connection has ended based on expiration of a single device traffic inactivity timer used for all applications on the mobile device.

47. The mobile device of claim 45, wherein means for determining when use of the network connection has ended based on expiration of a device traffic inactivity timer comprises means for determining when use of the network connection has ended based on expiration of a plurality of device traffic inactivity timers, wherein respective ones of the plurality of device traffic inactivity timers time inactivity of different applications executing on the mobile device.

48. The mobile device of claim 47, wherein at least one of the plurality of device traffic inactivity timers times inactivity of a particular application executing on the mobile device selected based on a frequency of network activity events by the particular application.

49. The mobile device of claim 47, further comprising means for determining whether more than one application is running simultaneously,
wherein means for determining when use of the network connection has ended based on a device traffic inactivity timer comprises means for determining when all of the plurality of device traffic inactivity timers have expired when more than one application is running simultaneously.

50. The mobile device of claim 47, wherein at least two of the plurality of device traffic inactivity timers expire after different time durations, the mobile device further comprising:
means for selecting one of the plurality of device traffic inactivity timers based upon whether the user is interacting with the mobile device.

51. The mobile device of claim 45, further comprising:
means for determining whether an application has a persistent end-to-end connection via the wireless telecommunication network; and
means for delaying transmission of the connection release message to the wireless telecommunication network by a short delay in response to i) determining that the application does not have a persistent end-to-end connection and ii) receiving a signal from the application indicating that the network connection is to be released.

52. The mobile device of claim 51, further comprising:
means for receiving a signal from the application indicating that the connection is to be released;
means for determining whether the network connection is being used for an on-going service;
means for determining whether an upcoming periodic event for the ongoing service is scheduled to occur after a network timeout time of a network inactivity timer in response to determining that the connection is being used for an on-going service; and means for sending the connection release message in response to determining that the upcoming periodic event occurs after the network timeout time.

53. The mobile device of claim 45, wherein means for updating the device traffic inactivity timer comprises:
means for monitoring application traffic by the applications during a sliding time window;
means for calculating an inter-traffic interval statistic value based on the application traffic within the sliding time window; and
means for updating a value of the device traffic inactivity timer according to the calculated inter-traffic interval statistic value.

54. The mobile device of claim 53, further comprising means for adjusting the inter-traffic interval statistic value based on a round trip time to the wireless telecommunication network.

55. The mobile device of claim 45, wherein means for updating the device traffic inactivity timer comprises:
means for monitoring application traffic by a group of applications during a sliding time window;
means for calculating an inter-traffic interval statistic value based on the application traffic within the sliding time window; and
means for updating a value of the device traffic inactivity timer associated with the group of applications according to the calculated inter-traffic interval statistic value.

56. The mobile device of claim 45, wherein means for updating the device traffic inactivity timer comprises:
means for determining whether a previous request of network connection release correctly determined that a network connection should be released;
means for increasing a value of the device traffic inactivity timer in response to determining that the previous request of network connection release prematurely released the network connection; and
means for decreasing the value of the device traffic inactivity timer in response to determining that the mobile device previously missed an opportunity to release the network connection.

57. The mobile device of claim 56, wherein means for updating the device traffic inactivity timer further comprises means for decreasing the value of the device traffic inactivity timer in response to determining that the previous request of the network connection release correctly determined that the network connection should be released.

58. The mobile device of claim 56, wherein:
means for increasing the value of the device traffic inactivity timer in response to determining that the previous request of the network connection release prematurely released the network connection comprises means for increasing the value of the device traffic inactivity timer by a first amount;
means for decreasing the value of the device traffic inactivity timer in response to determining that the mobile device previously missed an opportunity to release the network connection comprises means for decreasing the value of the device traffic inactivity timer by a second amount; and wherein the second amount is less than the first amount.

59. The mobile device of claim 45, further comprising:
means for determining an objective rate of premature release decisions;
means for calculating an observed rate of premature release decisions from outcomes of one or more requests of network connection release;
means for calculating a difference between the observed rate of premature release decisions and the objective rate of premature release decisions; and
means for updating the device traffic inactivity timer based on the calculated difference between the observed rate of premature release decisions and the objective rate of premature release decisions.

60. The mobile device of claim 59, wherein means for calculating the observed rate of premature release decisions from the outcomes of one or more requests of network connection release comprises means for calculating the observed rate of premature release decisions from the outcomes of fixed number of requests of network connection release.

61. The mobile device of claim 59, wherein means for calculating the observed rate of premature release decisions from the outcomes of one or more requests of network connection release comprises means for calculating the observed rate of premature release decisions from all outcomes of past requests of network connection release.

62. The mobile device of claim 59, wherein means for calculating the observed rate of premature release decisions from the outcomes of one or more requests of network connection release comprises means for calculating the observed rate of premature release decisions from the outcomes of requests of network connection release within an observation time window.

63. The mobile device of claim 59, wherein means for updating the device traffic inactivity timer based on the calculated difference between the observed rate of premature release decisions and the objective rate of premature release decisions comprises updating the device traffic inactivity timer in proportion to the calculated difference between the observed rate of premature release decisions and the objective rate of premature release decisions.

64. The mobile device of claim 63, wherein means for updating the device traffic inactivity timer based on the calculated difference between the observed rate of premature release decisions and the objective rate of premature release decisions comprises means for updating the device traffic inactivity timer by a fixed factor based on the calculated difference between the observed rate of premature release decisions and the objective rate of premature release decisions.

65. The mobile device of claim 63, wherein means for updating the device traffic inactivity timer based on the calculated difference between the observed rate of premature release decisions and the objective rate of premature release decisions comprises means for updating the device traffic inactivity timer by a time-varying factor based on the calculated difference between the observed rate of premature release decisions and the objective rate of premature release decisions.

66. The mobile device of claim 65, further comprising means for determining the time-varying factor according to the calculated difference between the observed rate of premature release decisions and the objective rate of premature release decisions.

67. A non-transitory processor-readable storage medium having stored thereon processor-executable instructions configured to cause a mobile device processor to perform operations comprising:
determining whether a user is interacting with the mobile device;
setting a time duration of a device traffic inactivity timer such that a length of the time duration is based upon whether the user is interacting with the mobile device, wherein the time duration of the device traffic inactivity timer is set to a first time duration in response to determining that the user is interacting with the mobile device and a second time duration that is shorter than the first time duration in response to determining that the user is not interacting with the mobile device;

monitoring network traffic activity by applications executing on the mobile device;

determining when use of a network connection has ended based on expiration of the device traffic inactivity timer;

sending a connection release message to a wireless telecommunications network to request release of the network connection on behalf of the applications in response to determining that use of the network connection has ended; and updating the device traffic inactivity timer.

68. The non-transitory processor-readable storage medium of claim 67, wherein the stored processor-executable instructions are configured to cause a mobile device processor to perform operations such that determining when use of the network connection has ended based on expiration of a device traffic inactivity timer comprises determining when use of the network connection has ended based on expiration of a single device traffic inactivity timer used for all applications on the mobile device.

69. The non-transitory processor-readable storage medium of claim 67, wherein the stored processor-executable instructions are configured to cause a mobile device processor to perform operations such that determining when use of the network connection has ended based on expiration of a device traffic inactivity timer comprises determining when use of the network connection has ended based on expiration of a plurality of device traffic inactivity timers, wherein respective ones of the plurality of device traffic inactivity timers time inactivity of different applications executing on the mobile device.

70. The non-transitory processor-readable storage medium of claim 69, wherein the stored processor-executable instructions are configured to cause a mobile device processor to perform operations such that at least one of the plurality of device traffic inactivity timers times inactivity of a particular application executing on the mobile device selected based on a frequency of network activity events by the particular application.

71. The non-transitory processor-readable storage medium of claim 69, wherein the stored processor-executable instructions are configured to cause a mobile device processor to perform operations further comprising determining whether more than one application is running simultaneously, and wherein the stored processor-executable instructions are configured to cause a mobile device processor to perform operations such that determining when use of the network connection has ended based on a device traffic inactivity timer comprises determining when all of the plurality of device traffic inactivity timers have expired when more than one application is running simultaneously.

72. The non-transitory processor-readable storage medium of claim 69, wherein the stored processor-executable instructions are configured to cause a mobile device processor to perform operations such that at least two of the plurality of device traffic inactivity timers expire after different time durations, and wherein the stored processor-executable instructions are configured to cause a mobile device processor to perform operations further comprising:

selecting one of the plurality of device traffic inactivity timers based upon whether the user is interacting with the mobile device.

73. The non-transitory processor-readable storage medium of claim 67, wherein the stored processor-executable instructions are configured to cause a mobile device processor to perform operations further comprising:

determining whether an application has a persistent end-to-end connection via the wireless telecommunication network; and delaying transmission of the connection release message to the wireless telecommunication network by a short delay in response to i) determining that the application does not have a persistent end-to-end connection and ii) receiving a signal from the application indicating that the network connection is to be released.

74. The non-transitory processor-readable storage medium of claim 73, wherein the stored processor-executable instructions are configured to cause a mobile device processor to perform operations further comprising:

receiving a signal from the application indicating that the connection is to be released;

determining whether the network connection is being used for an on-going service;

determining whether an upcoming periodic event for the on-going service is scheduled to occur after a network timeout time of a network inactivity timer in response to determining that the connection is being used for an on-going service; and sending the connection release message in response to determining that the upcoming periodic event occurs after the network timeout time.

75. The non-transitory processor-readable storage medium of claim 67, wherein the stored processor-executable instructions are configured to cause a mobile device processor to perform operations such that updating the device traffic inactivity timer comprises:

monitoring application traffic by the applications during a sliding time window;

calculating an inter-traffic interval statistic value based on the application traffic within the sliding time window; and updating a value of the device traffic inactivity timer according to the calculated inter-traffic interval statistic value.

76. The non-transitory processor-readable storage medium of claim 75, wherein the stored processor-executable instructions are configured to cause a mobile device processor to perform operations further comprising adjusting the inter-traffic interval statistic value based on a round trip time to the wireless telecommunication network.

77. The non-transitory processor-readable storage medium of claim 67, wherein the stored processor-executable instructions are configured to cause a mobile device processor to perform operations such that updating the device traffic inactivity timer comprises:

monitoring application traffic by a group of applications during a sliding time window;

calculating an inter-traffic interval statistic value based on the application traffic within the sliding time window; and updating a value of the device traffic inactivity timer associated with the group of applications according to the calculated inter-traffic interval statistic value.

78. The non-transitory processor-readable storage medium of claim 67, wherein the stored processor-executable instructions are configured to cause a mobile device processor to perform operations such that updating the device traffic inactivity timer comprises:

determining whether a previous request of network connection release correctly determined that a network connection should be released;

increasing a value of the device traffic inactivity timer in response to determining that the previous request of network connection release prematurely released the network connection; and decreasing the value of the device traffic inactivity timer in response to determining that the mobile device previously missed an opportunity to release the network connection.

79. The non-transitory processor-readable storage medium of claim 78, wherein the stored processor-executable instructions are configured to cause a mobile device processor to perform operations such that updating the device traffic inactivity timer further comprises decreasing the value of the device traffic inactivity timer in response to determining that the previous request of the network connection release correctly determined that the network connection should be released.

80. The non-transitory processor-readable storage medium of claim 79, wherein the stored processor-executable instructions are configured to cause a mobile device processor to perform operations such that:

increasing the value of the device traffic inactivity timer in response to determining that the previous request of network connection release prematurely released the network connection comprises increasing the value of the device traffic inactivity timer by a first amount;

decreasing the value of the device traffic inactivity timer in response to determining that the mobile device previously missed an opportunity to release the network connection comprises decreasing the value of the device traffic inactivity timer by a second amount; and wherein the second amount is less than the first amount.

81. The non-transitory processor-readable storage medium of claim 67, wherein the stored processor-executable instructions are configured to cause a mobile device processor to perform operations further comprising:

determining an objective rate of premature release decisions;

calculating an observed rate of premature release decisions from outcomes of one or more requests of network connection release;

calculating a difference between the observed rate of premature release decisions and the objective rate of premature release decisions; and updating the device traffic inactivity timer based on the calculated difference between the observed rate of premature release decisions and the objective rate of premature release decisions.

82. The non-transitory processor-readable storage medium of claim 81, wherein the stored processor-executable instructions are configured to cause a mobile device processor to perform operations such that calculating the observed rate of premature release decisions from the outcomes of one or more requests of network connection release comprises calculating the observed rate of premature release decisions from outcomes of a fixed number of requests of network connection release.

83. The non-transitory processor-readable storage medium of claim 81, wherein the stored processor-executable instructions are configured to cause a mobile device processor to perform operations such that calculating the observed rate of premature release decisions from the outcomes of one or more requests of network connection release outcomes comprises calculating the observed rate of premature release decisions from all outcomes of past requests of network connection release.

84. The non-transitory processor-readable storage medium of claim 81, wherein the stored processor-executable instructions are configured to cause a mobile device processor to perform operations such that calculating the observed rate of premature release decisions from the outcomes of one or more requests of network connection release outcomes comprises calculating the observed rate of premature release decisions from outcomes of requests of network connection release within an observation time window.

85. The non-transitory processor-readable storage medium of claim 81, wherein the stored processor-executable instructions are configured to cause a mobile device processor to perform operations such that updating the device traffic inactivity timer based on the calculated difference between the observed rate of premature release decisions and the objective rate of premature release decisions comprises updating the device traffic inactivity timer in proportion to the calculated difference between the observed rate of premature release decisions and the objective rate of premature release decisions.

86. The non-transitory processor-readable storage medium of claim 85, wherein the stored processor-executable instructions are configured to cause a mobile device processor to perform operations such that updating the device traffic inactivity timer based on the calculated difference between the observed rate of premature release decisions and the objective rate of premature release decisions comprises updating the device traffic inactivity timer by a fixed factor based on the calculated difference between the observed rate of premature release decisions and the objective rate of premature release decisions.

87. The non-transitory processor-readable storage medium of claim 85, wherein the stored processor-executable instructions are configured to cause a mobile device processor to perform operations such that updating the device traffic inactivity timer based on the calculated difference between the observed rate of premature release decisions and the objective rate of premature release decisions comprises updating the device traffic inactivity timer by a time-varying factor based on the calculated difference between the observed rate of premature release decisions and the objective rate of premature release decisions.

88. The non-transitory processor-readable storage medium of claim 87, wherein the stored processor-executable instructions are configured to cause a mobile device processor to perform operations such that the time-varying factor is determined according to the calculated difference between the observed rate of premature release decisions and the objective rate of premature release decisions.

* * * * *